(12) United States Patent
Kawata et al.

(10) Patent No.: US 12,433,550 B2
(45) Date of Patent: Oct. 7, 2025

(54) NUCLEAR MEDICINE DIAGNOSTIC DEVICE, DATA PROCESSING METHOD, AND NON-TRANSITORY COMPUTER-READABLE MEDIUM WITH DETECTION TIMING CORRECTION

(71) Applicant: CANON MEDICAL SYSTEMS CORPORATION, Tochigi (JP)

(72) Inventors: Go Kawata, Moriya (JP); Manabu Teshigawara, Otawara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 199 days.

(21) Appl. No.: 18/477,600

(22) Filed: Sep. 29, 2023

(65) Prior Publication Data

US 2024/0115219 A1    Apr. 11, 2024

(30) Foreign Application Priority Data

Sep. 30, 2022  (JP) .................................. 2022-159094

(51) Int. Cl.
*A61B 6/03* (2006.01)
*A61B 6/42* (2024.01)

(52) U.S. Cl.
CPC ............ *A61B 6/037* (2013.01); *A61B 6/4241* (2013.01)

(58) Field of Classification Search
CPC .............................. A61B 6/037; A61B 6/4241
See application file for complete search history.

(56) References Cited

U.S. PATENT DOCUMENTS

| | | | | |
|---|---|---|---|---|
| 4,864,140 A | * | 9/1989 | Rogers | G01T 1/2985 250/369 |
| 6,281,504 B1 | * | 8/2001 | Takayama | G01T 1/1615 250/363.04 |
| 2003/0071219 A1 | * | 4/2003 | Motomura | G01T 1/2928 250/363.05 |
| 2008/0224050 A1 | * | 9/2008 | Thielemans | G01T 1/1647 250/362 |
| 2011/0297835 A1 | * | 12/2011 | Yamada | A61B 6/037 250/336.1 |
| 2011/0299656 A1 | * | 12/2011 | Yamada | A61B 6/037 378/116 |
| 2011/0309252 A1 | * | 12/2011 | Moriyasu | A61B 6/037 250/362 |

(Continued)

OTHER PUBLICATIONS

Berg et al., "Using convolutional neural networks to estimate time-of-flight from PET detector waveforms", Phys Med Biol., vol. 63, No. 2, 2019, 15 pages.

*Primary Examiner* — Blake C Riddick
(74) *Attorney, Agent, or Firm* — Oblon, McClelland, Maier & Neustadt, L.L.P.

(57) ABSTRACT

A nuclear medicine diagnostic device according to an embodiment includes processing circuitry. The processing circuitry obtains first photon-number information detected by a first detector; calculates, based on the first photon-number information, a first light emission probability model corresponding to the first detector; identifies, based on the first light emission probability model, a first timing at which the detection probability becomes equal to or greater than a predetermined threshold value; measures the detection timing of an event detected by the first detector; and corrects the detection timing based on the first timing.

13 Claims, 13 Drawing Sheets

(56) References Cited

U.S. PATENT DOCUMENTS

| | | | | |
|---|---|---|---|---|
| 2012/0138804 A1* | 6/2012 | Miyaoka | ............... | G01T 1/2985 |
| | | | | 250/362 |
| 2013/0006093 A1* | 1/2013 | Raleigh | ................. | A61B 6/584 |
| | | | | 600/407 |
| 2013/0032706 A1* | 2/2013 | Cho | ..................... | G06T 7/0012 |
| | | | | 250/252.1 |
| 2015/0289829 A1* | 10/2015 | Yamada | ................... | A61B 6/56 |
| | | | | 378/209 |
| 2017/0042492 A1* | 2/2017 | Noshi | .................... | A61B 6/032 |
| 2020/0066009 A1* | 2/2020 | Dwivedi | ............... | G06T 11/006 |

\* cited by examiner

NUCLEAR MEDICINE DIAGNOSTIC DEVICE, DATA PROCESSING METHOD, AND NON-TRANSITORY COMPUTER-READABLE MEDIUM WITH DETECTION TIMING CORRECTION

CROSS-REFERENCE TO RELATED APPLICATIONS

This application is based upon and claims the benefit of priority from Japanese Patent Application No. 2022-159094, filed on Sep. 30, 2022; the entire contents of which are incorporated herein by reference.

FIELD

Embodiments described herein relate generally to a nuclear medicine diagnostic device, a data processing method, and a non-transitory computer-readable storage medium.

BACKGROUND

As far as reconstructing PET images is concerned, a ToF kernel (ToF stands for Time of Flight) is used in performing image reconstruction. A ToF kernel represents a probability density function of a detection event that is expressed as a function of the detection-time difference between the signals detected by two detectors. Regarding the PET image reconstruction, it is desirable that image reconstruction is performed using a ToF kernel having excellent accuracy. Moreover, in the PET image reconstruction, it is desirable that the half-value width of the ToF spectrum is narrow.

From such a perspective, it is desirable that the period of time starting from the incidence of gamma rays onto a scintillator till the occurrence of light emission can be accurately estimated. In that regard, for example, it is possible to think of using a neural network to learn the relationship between the detected signal waveforms and the detection timings. However, in the case of using a neural network for the learning, machine learning needs to be performed regarding the relationship between the detected signal waveforms and the detection timings, and that sometimes requires a lot of computational resources.

DETAILED DESCRIPTION

A medical nuclear diagnostic device according to an aspect of the present invention includes processing circuitry. The processing circuitry obtains first photon-number information detected by a first detector; calculates, based on the first photon-number information, a first light emission probability model corresponding to the first detector; identifies, based on the first light emission probability model, a first timing at which the detection probability becomes equal to or greater than a predetermined threshold value; measures the detection timing of an event detected by the first detector; and corrects the detection timing based on the first timing.

Embodiment

An exemplary embodiment of a nuclear medicine diagnostic device, a data processing method, and non-transitory computer-readable storage medium is described below in detail with reference to the accompanying drawings.

Figure 1:
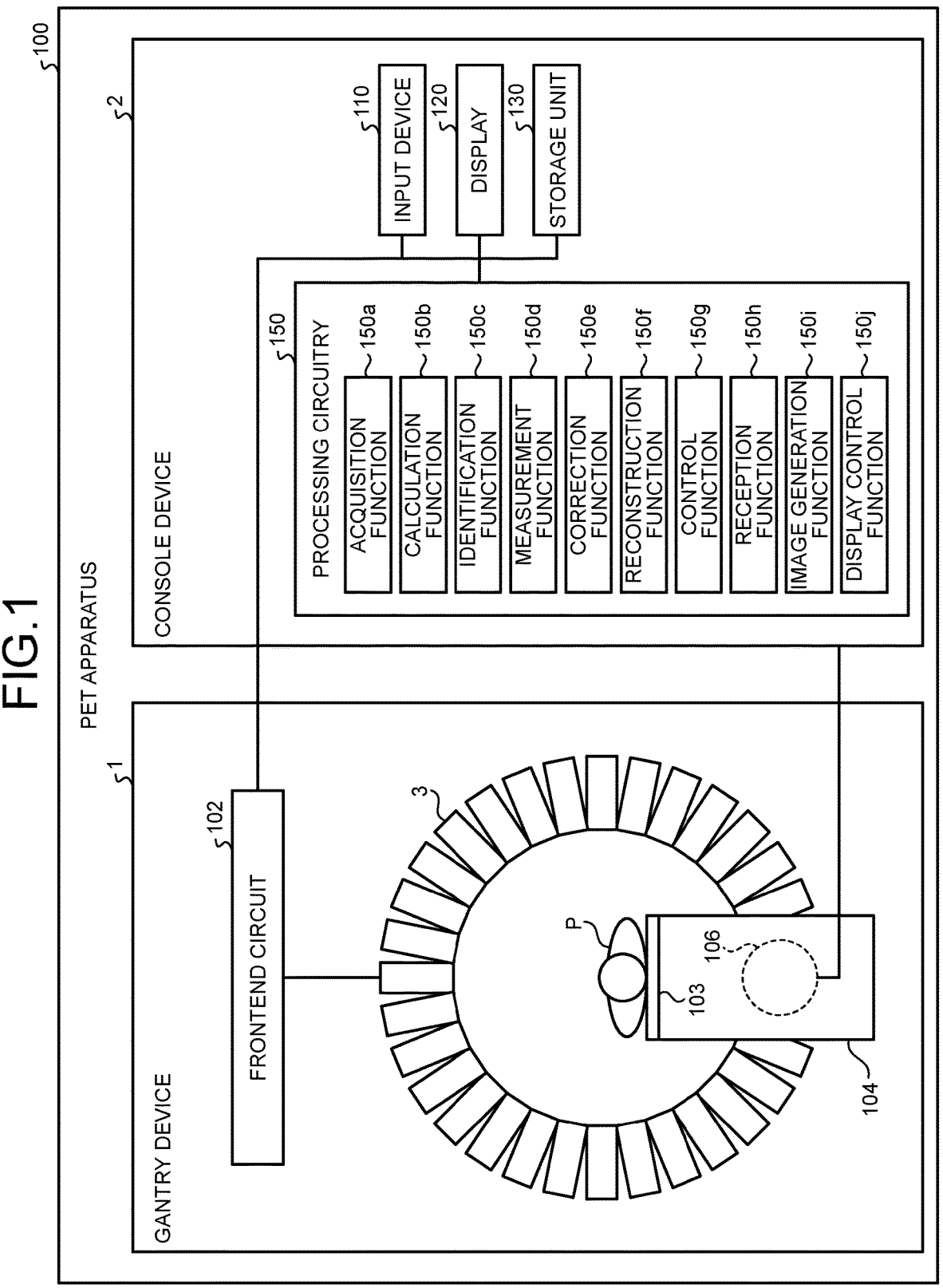
FIG. 1 is a diagram illustrating an exemplary configuration of a nuclear medicine diagnostic device according to an embodiment.

FIG. 1 is a diagram illustrating a configuration of a PET device 100 representing a nuclear medicine diagnostic device according to the embodiment. As illustrated in FIG. 1, the PET device 100 according to the embodiment includes a gantry device 1 and a console device 2. The gantry device 1 includes detectors 3, frontend circuitry 102, a couchtop 103, a couch 104, and a couch driving unit 106.

The detectors 3 are meant for detecting radioactivity by detecting the scintillation light (fluorescence) representing the light re-emitted at the time of retransition to the ground state of a material that had switched to the excited state due to the interaction of gamma rays, which are generated when the positrons emitted from a medicinal substance administered and cumulated in a subject cause annihilation with the electrons of the surrounding body tissue, with a luminescent material. Moreover, in the embodiment, the detectors 3 are capable of detecting the Cerenkov light too. The detectors 3 detect the energy information of the gamma radiation that is generated when the positrons emitted from a medicinal substance, which is administered and cumulated in a subject, cause annihilation with the electrons of the surrounding body tissue. Herein, a plurality of detectors 3 is arranged to surround a subject P in a ring-like manner, and each detector 3 is made of, for example, a plurality of detector blocks.

Typically, each detector 3 is made of a scintillator crystal and a photodetection surface formed with a photodetection element.

As far as the material of the scintillator crystal is concerned, for example, it is possible to use a material suitable for generating the Cerenkov light. For example, it is possible to use bismuth germanium oxide (BGO) or a lead compound such as lead glass ($SiO_2+PbO$), or lead fluoride ($PbF_2$), or PWO (lead tungstate ($PbWO_4$)). As another example, it is possible to use a scintillator crystal such as lutetium yttrium oxyorthosilicate (LYSO), or lutetium oxyorthosilicate (LSO), or lutetium gadolinium oxyorthosilicate (LGSO), or bismuth germanium oxide (BGO). The photodetection element constituting a photodetection surface 3b, is made of, for example, a plurality of pixels each of which is configured with a single photon avalanche diode (SPAD). Meanwhile, the configuration of the detectors 3 is not limited to the configuration explained above. Alternatively, as an example, as the photodetection element, silicon photomultiplier (SiPM) or a photomultiplier tube can be used.

A scintillator crystal can be a monolithic crystal, and the photodetection surface made of a photodetection element can be placed on, for example, the six faces of a scintillator crystal. Meanwhile, in the embodiment described below, firstly the explanation is given about an example in which the scintillator crystal in the detectors 3 is not a monolithic crystal.

In the gantry device 1, the frontend circuitry 102 generates count information from the output signals of the detector 3; and the count information is stored in a storage unit 130 of the console device 2. Meanwhile, each detector 3 is partitioned into a plurality of blocks and includes the frontend circuitry 102.

The frontend circuitry 102 converts the output signals of the corresponding detector 3 and generates count information. The count information contains the detection positions of annihilation gamma rays, the energy values, and the detection time. For example, the frontend circuitry 102 identifies such a plurality of photodetection elements which converted the scintillation light into electrical signals at the same timing. Then, the frontend circuitry 102 identifies the scintillator number (P) indicating the position of that scintillator on which the annihilation gamma rays have fallen. Regarding the method for identifying the position of the scintillator on which the annihilation gamma rays have fallen, the identification can be done by performing gravity center processing based on the position of each photodetection element and the intensity of electrical signals. Moreover, when the scintillators have a corresponding size to the element size of the photodetection elements, for example, the scintillator corresponding to that photodetection element from which the maximum output was obtained is assumed to be the scintillator position on which the annihilation gamma rays have fallen; and the final identification is done by also taking into account the inter-scintillator scattering.

Moreover, the frontend circuitry 102 performs integral calculation of the intensity of the electrical signals output from each photodetection element or measures the period of time for which the electrical signal intensity exceeds a threshold value (i.e., measures the time over threshold), and identifies the energy value (E) of the annihilation gamma rays incident on the detector 3. Furthermore, the frontend circuitry 102 identifies the detection time (T) for which the detector 3 detects the scintillation light attributed to the annihilation gamma rays. Meanwhile, the detection time (T) either can be an absolute timing or can be the elapsed time since the start of imaging. In this way, the frontend circuitry 102 generates count information containing the scintillator number (P), the energy value (E), and the detection period (T).

The frontend circuitry 102 is implemented using, for example, a central processing unit (CPU), or a graphical processing unit (GPU), or a circuit such as an application specific integrated circuit (ASIC) or a programmable logic device (for example, a simple programmable logic device (SPLD), a complex programmable logic device (CPLD), or a field programmable gate array (FPGA)). Herein, the frontend circuitry 102 represents an example of a frontend unit.

The couchtop 103 is a bed on which the subject P is asked to lie down; and is placed on top of the couch 104. The couch driving unit 106 moves the couchtop 103 under the control of a control function 150g of processing circuitry 150. For example, the couch driving unit 106 moves the couchtop 103 so that the subject P is moved inside the imaging bore of the gantry device 1.

The console device 2 receives the operations performed by the operator with respect to the PET device 100, and accordingly controls the imaging of PET images as well as reconstructs PET images using the count information collected by the gantry device 1. As illustrated in FIG. 1, the console device 2 includes the processing circuitry 150, an input device 110, a display 120, and a storage unit 130. The constituent elements of the console device 2 are connected to each other by a bus. Regarding the details of the processing circuitry 150, the explanation is given later.

The input device 110 is a mouse or a keyboard used by the operator of the PET device 100 for inputting various instructions and various settings; and transfers the input instructions and the input settings to the processing circuitry 150. For example, the input device 110 is used in inputting an imaging start instruction.

The display 120 is a monitor referred to by the operator; and is used to display the respiratory waveform of the subject, to display PET images, and to display a graphical user interface (GUI) meant for receiving various instructions and various settings from the operator.

The storage unit 130 is used to store a variety of data useful in the PET device 100. The storage unit 130 is configured using, for example, a memory. As an example, the memory is configured using a semiconductor memory device such as a random access memory (RAM) or a flash memory, or using a hard disk, or using an optical disk. The storage unit 130 is used to store the following: count information in which the scintillator numbers (P), the energy values (E), and the detection time (T) are held in a corresponding manner; coincidence counting information in which the sets of count information are held in a corresponding manner to coincidence numbers representing the serial numbers of the sets of coincidence counting information; projection data obtained as a result of collecting the coincidence counting information; and reconstructed PET images.

The processing circuitry 150 includes an acquisition function 150a, a calculation function 150b, an identification function 150c, a measurement function 150d, a correction function 150e, a reconstruction function 150f, the control function 150g, a reception function 150h, an image generation function 150i, and a display control function 150j. Regarding the acquisition function 150a, the calculation function 150b, the identification function 150c, the correction function 150e, and the reconstruction function 150f, the detailed explanation is given later.

Thus, according to the present embodiment, the acquisition function 150a, the calculation function 150b, the identification function 150c, the measurement function 150d, the correction function 150e, the reconstruction function 150f, the control function 150g, the reception function 150h, the image generation function 150i, and the display control function 150j are implemented. The processing functions implemented in the acquisition function 150a, the calculation function 150b, the identification function 150c, the correction function 150e, and the reconstruction function 150f are stored as computer-executable programs in the storage unit 130. The processing circuitry 150 is a processor that reads the computer programs from the storage unit 130 and executes them to implement the corresponding functions. In other words, upon reading the computer programs, the processing circuitry 150 gets equipped with the functions illustrated in the processing circuitry 150 in FIG. 1.

With reference to FIG. 1, the acquisition function 150a, the calculation function 150b, the identification function 150c, the measurement function 150d, the correction function 150e, the reconstruction function 150f, the control function 150g, the reception function 150h, the image generation function 150i, and the display control function 150j are implemented in the single processing circuitry 150. However, alternatively, a plurality of individual processors can be combined to constitute the processing circuitry 150, and each processor can execute computer programs to implement functions. In other words, the abovementioned functions can be configured as computer programs, and single processing circuitry 150 can execute the computer programs. As another example, specific functions can be installed in a program execution circuit that is a dedicated and independent circuit.

In the explanation given above, the term "processor" implies, for example, a central processing unit (CPU), or a graphical processing unit (GPU), or a circuit such as an application specific integrated circuit (ASIC) or a programmable logic device (for example, a simple programmable logic device (SPLD), a complex programmable logic device (CPLD), or a field programmable gate array (FPGA)). The processor reads the computer programs stored in the storage unit 130, and executes them to implement the functions.

Meanwhile, with reference to FIG. 1, the acquisition function 150a, the calculation function 150b, the identification function 150c, the measurement function 150d, the correction function 150e, the reconstruction function 150f, the control function 150g, the reception function 150h, the image generation function 150i, and the display control function 150j respectively represent an example of an obtaining unit, a calculating unit, a measuring unit, a correcting unit, a reconstructing unit, a control unit, a receiving unit, an image generating unit, and a display control unit.

Meanwhile, in place of the processing circuitry 150, the frontend circuitry 102 can take up the operations of the measuring unit and the identifying unit.

In the processing circuitry 150, the reconstruction function 150f reconstructs PET images based on the data obtained from the frontend circuitry 102, and the image generation function 150i generates images.

The control function 150g of the processing circuitry 150 controls the gantry device 1 and the console device 2, so as to perform overall control of the PET device 100. For example, the control function 150g of the processing circuitry 150 controls the imaging performed in the PET device 100. Moreover, the control function 150g of the processing circuitry 150 controls the couch driving unit 106.

In the processing circuitry 150, the reception function 150h receives input of information from the user via the input device 110. Moreover, in the processing circuitry 150, the display control function 150j displays PET images and other data in the display 120. Furthermore, in the processing circuitry 150, the image generation function 150i generates various images.

Given below is the brief explanation about the background related to the embodiment.

As far as reconstructing PET images is concerned, a ToF kernel (ToF stands for Time of Flight) is used in performing image reconstruction. A ToF kernel represents a probability density function of a detection event that is expressed as a function of the detection-time difference between the signals detected by two detectors. In the PET image reconstruction, it is desirable that image reconstruction is performed using a ToF kernel having excellent accuracy. Moreover, in the PET image reconstruction, it is desirable that the half-value width of the ToF spectrum is narrow.

From such a perspective, it is desirable that the period of time starting from the incidence of gamma rays onto a scintillator till the occurrence of light emission can be accurately estimated. In that regard, for example, it is possible to think of using a neural network to learn the relationship between the detected signal waveforms and the detection timings. However, in the case of using a neural network for the learning, machine learning needs to be performed regarding the relationship between the detected signal waveforms and the detection timings, and that sometimes requires a lot of computational resources.

In that regard, in the embodiment, based on a light emission model, the delay time is estimated from the incidence of gamma rays onto a scintillator till the occurrence of light emission, and the ToF kernel is corrected based on the estimation result. As a result, the ToF spectrum can be sharpened and the quality of the reconstructed PET images can be enhanced.

More particularly, the nuclear medicine diagnostic device according to the embodiment includes an obtaining unit, a calculating unit, an identifying unit, a measuring unit, and a correcting unit. The obtaining unit obtains first photon-number information that is detected by a first detector. Based on the first photon-number information, the calculating unit calculates a first light emission probability model corresponding to the first detector. Based on the first light emission probability model, the identifying unit identifies a first timing at which the light emission detection probability becomes equal to or greater than a predetermined threshold value. The measuring unit measures the detection timing of an event detected by the first detector. The correcting unit corrects the detection timing based on the first timing.

A data processing method according to the embodiment includes obtaining first photon-number information that is detected by a first detector; calculating, based on the first photon-number information, a first light emission probability model corresponding to the first detector; identifying, based on the first light emission probability model, a first timing at which the light emission detection probability becomes equal to or greater than a predetermined threshold value; measuring the detection timing of an event detected by the first detector; and correcting the detection timing based on the first timing.

A computer program according to the embodiment causes a computer to perform an operation that includes obtaining first photon-number information that is detected by a first detector; calculating, based on the first photon-number information, a first light emission probability model corresponding to the first detector; identifying, based on the first light emission probability model, a first timing at which the light emission detection probability becomes equal to or greater than a predetermined threshold value; measuring the detection timing of an event detected by the first detector; and correcting the detection timing based on the first timing.

Figure 2:
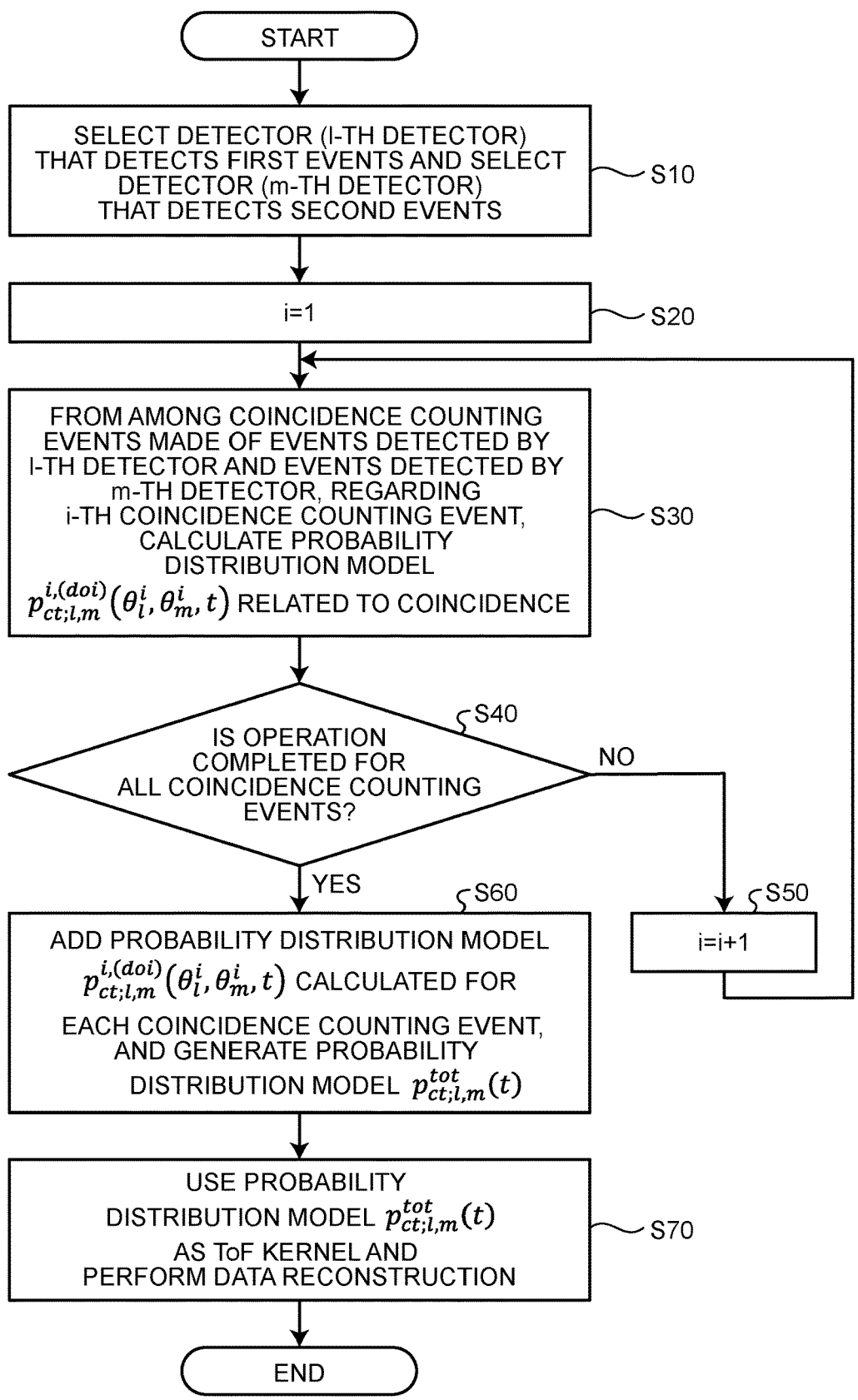
FIG. 2 is a flowchart for explaining a flow of the operations performed in the nuclear medicine diagnostic device according to the embodiment.

With reference to FIGS. 2 to 10, given below is the detailed explanation of the operations performed in the nuclear medicine diagnostic device according to the embodiment. In FIG. 2 is illustrated a flow of the operations performed in the PET device 100 representing the nuclear medicine diagnostic device according to the embodiment. In the flowchart explained below, for ease of explanation, the explanation is given about the case in which probability distribution models (ToF kernels) are generated only for a first detector l and a second detector m. However, typically, as far as image reconstruction is concerned, the processing circuitry 150 generates a probability distribution model for all pairs of detectors l and m, and then performs image reconstruction at Step S70. In that case, for all pairs of detectors l and m, the processing circuitry 150 repeatedly performs the operations from Step S10 to Step S60, and then performs the operation at Step S70.

At Step S10, the processing circuitry 150 selects the values of the detectors l and m representing the concerned pair of detectors for which the processing is to be performed. That is, the processing circuitry 150 selects the values of "l" and "m" that characterize the first detector l (i.e., the l-th detector), which detects a first event, and the second detector m (i.e., the m-th detector), which detects a second event. Herein, a first event and a second event constitute a single coincidence counting event. In other words, each coincidence counting event is made of two events, namely, a first event and a second event.

Then, at Step S20, the processing circuitry 150 sets "1" as the value of "i" representing the serial number of the coincidence counting event. Thus, i=1 implies that the processing circuitry 150 processes the 1-st coincidence counting event.

Subsequently, at Step S30, the calculation function 150b of the processing circuitry 150 calculates a probability distribution model $p_{ct; l, m}^{i, (doi)}(\theta_l^i, \theta_m^i, t)$ related to the coincidence with respect to the i-th coincidence counting event, from among the coincidence counting events made of the events detected by the l-th detector and the events detected by the m-th detector. In the i-th coincidence counting event, $\theta_l^i$ represents the parameter obtained regarding the l-th detector and $\theta_m^i$ represents the parameter obtained regarding the m-th detector. Moreover, the symbol (doi) implies that the uncertainty of the light emission position inside the scintillator may or may not be taken into account. In an illustrative embodiment in which the uncertainty of the light emission position inside the scintillator is taken into account, the calculation function 150b of the processing circuitry 150 calculates a probability distribution model $p_{ct; l, m}^{i, (doi)}(\theta_l^i, \theta_m^i, t)$ which is related to the coincidence in which the uncertainty of the light emission position inside the scintillator is taken into account. On the other hand, in an illustrative embodiment in which the uncertainty of the light emission position inside the scintillator is not taken into account, the calculation function 150b of the processing circuitry 150 calculates a probability distribution model $p_{ct; l, m}^{i}(\theta_l^i, \theta_m^i, t)$ which is related to the coincidence and in which the uncertainty of the light emission position inside the scintillator is not taken into account.

Figure 3:
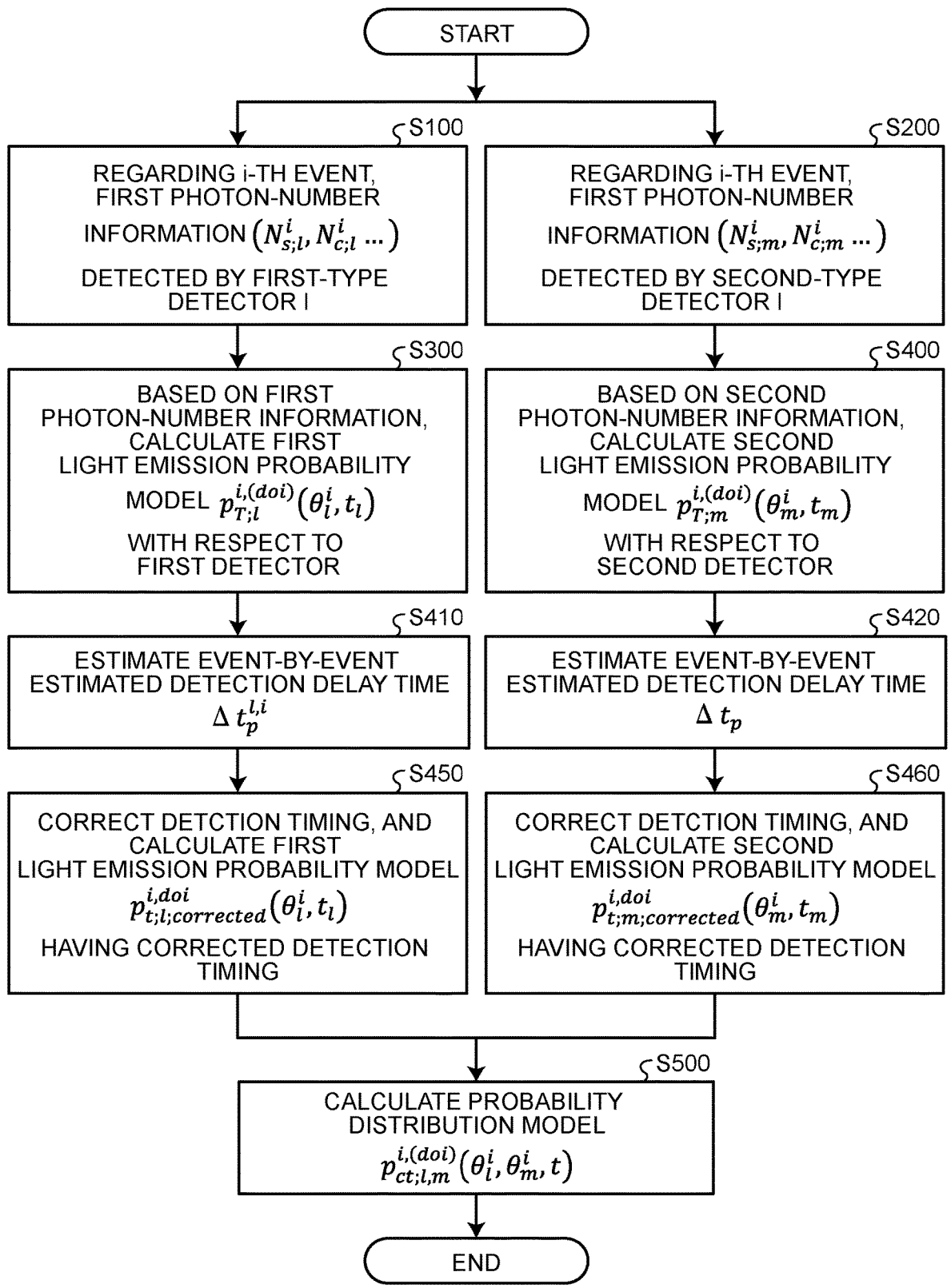
FIG. 3 is a diagram for explaining in more detail an example of the operations performed at Step S30 illustrated in FIG. 2.

In FIG. 3 is illustrated a flow of more detailed operations performed during the operation at Step S30 illustrated in FIG. 2. That is, the operations performed from Step S100 to Step S500 illustrated in FIG. 3 represent the detailed explanation of the operation performed at Step S30 illustrated in FIG. 2.

Firstly, at Step S100, the acquisition function 150a of the processing circuitry 150 obtains, regarding the i-th coincidence counting event, first photon-number information related to a first event detected by the first detector l.

For example, the first photon-number information represents a scintillation photon number $N_{s; l}^i$ regarding the concerned event. As another example, the first photon-number information represents a Cerenkov photon number $N_{c; l}^i$ regarding the concerned event. As still another example, the first photon-number information represents a scintillation photon number $N_{s; l}^i$ and a Cerenkov photon number $N_{c; l}^i$ regarding the concerned event. That is, the acquisition function 150a of the processing circuitry 150 obtains, as the first photon-number information, either the scintillation photon number $N_{s; l}^i$, or the Cerenkov photon number $N_{c; l}^i$, or the scintillation photon number $N_{s; l}^i$ and the Cerenkov photon number $N_{c; l}^i$.

Typically, the first photon-number information (and second photon-number information) that is obtained by the acquisition function 150a of the processing circuitry 150 is, for example, obtained on an event-by-event basis. However, the embodiment is not limited to that example. Alternatively, as the first photon-number information (and the second photon-number information), the acquisition function 150a of the processing circuitry 150 can obtain, for example, the average photon number calculated by the first detector l.

Moreover, typically, the first photon-number information (and the second photon-number information) that is obtained by the acquisition function 150a of the processing circuitry 150 is, for example, obtained on a detector-by-detector basis. However, the embodiment is not limited to that example. Alternatively, as the first photon-number information (and the second photon-number information), the acquisition function 150a of the processing circuitry 150 can obtain, for example, identical photon-number information across all detectors.

Meanwhile, the PET device 100 can obtain the first photon-number information based on the energy spectrum obtained by the first detector l.

Figure 4:
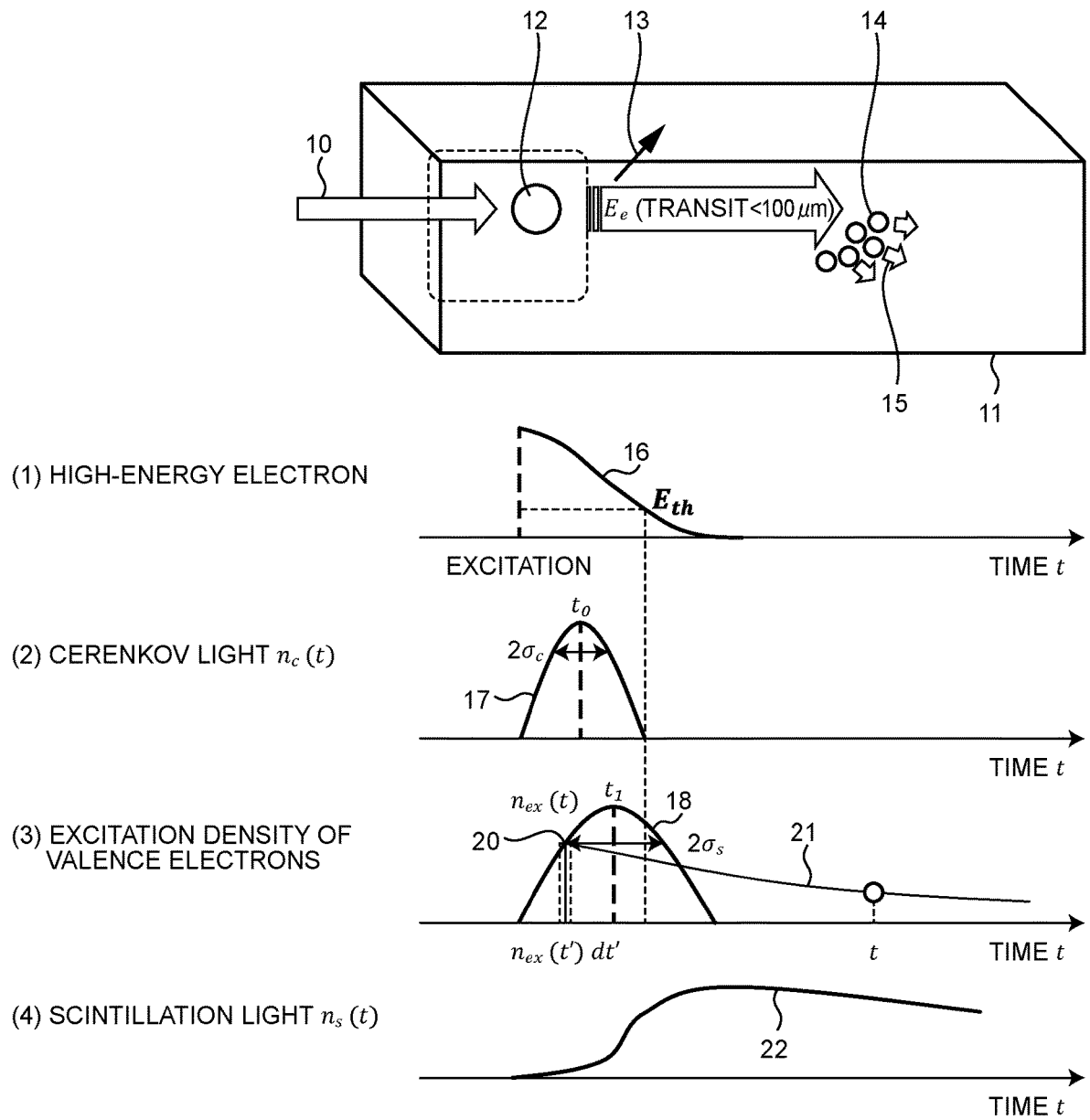
FIG. 4 is a diagram for explaining the operations performed in the nuclear medicine diagnostic device according to the embodiment.

With reference to FIG. 4, the explanation is given about a light emission model in the detector 3 and about the photon spectrum obtained by the acquisition function 150a of the processing circuitry 150. Herein, a gamma ray 10 falls onto a scintillator 11 of the detector 3 and gives energy to the scintillator 11 in the form of photoelectric absorption or Compton scattering; and it results in the generation of a high-energy electron 12. A curved line 16 represents an energy $E_e$ of the high-energy electron 12 as a function of a timing t. As the high-energy electron 12 travels inside the scintillator 11, it goes on losing the energy. However, as long as that energy is greater than a threshold value $E_{th}$, the high-energy electron 12 releases a Cerenkov light 13 into the surrounding.

A curved line 17 is obtained when a photon density $n_c(t)$ of the Cerenkov light is approximated to the Gauss function of the timing t. More particularly, the photon density $n_c(t)$ of the Cerenkov light is given below in Equation (1) in which $N_c$ represents the photon number of the Cerenkov light, $\sigma_c$ represents the half-value width of the Cerenkov light spectrum, and $t_0$ represents the peak timing of the Cerenkov light.

$$n_C(t) = \frac{N_C}{\sqrt{2\pi}\sigma_C}\exp\left(-\frac{(t-t_0)^2}{2\sigma_C^2}\right) \quad (1)$$

Meanwhile, accompanying the transit thereof, the high-energy electron 12 causes excitation of valence electrons 14 inside the scintillator 11; and, when the excited valence electrons 14 return to the ground state, a scintillation light 15 gets released. A curved line 19 represents the result of approximating an excitation density $n_{ex}(t)$ of the valence electrons to the Gauss function of the timing t. The excitation density $n_{ex}(t)$ of the valence electrons is given below in Equation (2) in which $N_s$ represents the photon number of the scintillation light, $\sigma_s$ represents the half-value width of the scintillation light spectrum, and $t_1$ represents the peak timing of the scintillation light.

$$n_{ex}(t) = \frac{N_S}{\sqrt{2\pi}\sigma_S}\exp\left(-\frac{(t-t_1)}{2\sigma_S^2}\right) \quad (2)$$

A curved line 21 indicates the situation in which the excited valence electrons make transition to the original state at a timing 20. Accompanying the transition of the excited valence electrons to the original state, a scintillation light is generated. A curved line 22 represents a photon density $n_s(t)$ of the scintillation light as a function of the timing t. The photon density $n_s(t)$ of the scintillation light is given below in Equation (3) in which a relaxation constant $\tau_s$ and the excitation density $n_{ex}(t)$ of the valence electrons are used.

$$n_S(t) = \int_{-\infty}^{t} \frac{N_{ex}(t')}{\tau_{S_i}}\exp\left(-\frac{(t-t')}{\tau_{S_i}}\right)dt' \quad (3)$$

Assuming that the function form of the excitation density $n_{ex}(t)$ of the valence electrons is given in Equation (2); when Equation (2) is substituted in Equation (3), Equation (4) given below is obtained.

$$n_S(t) = \frac{N_S}{2\tau_{S_i}}e^{\frac{\sigma_S^2}{2\tau_{S_i}^2}+\frac{t_1}{\tau_{S_i}}}\exp\left(-\frac{t}{\tau_{S_i}}\right)\left(1+\text{erf}\left(\frac{t-t_1-\frac{\sigma_S^2}{\tau_{S_i}}}{\sqrt{2}\sigma_S}\right)\right) \quad (4)$$

That is, as an example, the PET device 100 can obtain the energy spectrums obtained by the first detector 1 and the second detector m; generate, based on those energy spectrums, the spectrums illustrated in the curved lines 17 and 22; and obtain the first photon-number information and the second photon-number information based on the generated spectrums.

Meanwhile, a distribution function $p_{ph}(t)$ of the light emission is proportionate to the sum of the photon density $n_c(t)$ of the Cerenkov light and the photon density $n_s(t)$ of the scintillation light. Thus, Equation (5) given below is holds true.

$$p_{ph}(t) \propto n_C(t) + n_S(t) \quad (5)$$

The distribution function $p_{ph}(t)$ of the light emission is standardized as given below in Equation (6).

$$\int_0^{+\infty} p_{ph}(t) = 1 \quad (6)$$

Meanwhile, at Step S100, regarding the information other than the photon-number information, the acquisition function 150a of the processing circuitry 150 can obtain such information as a parameter set related to the first detector 1. As an example, the acquisition function 150a of the processing circuitry 150 can obtain, either in place of or in addition to the first photon-number information, temporal resolution a c of the light sensor for the Cerenkov light as one of the parameters in a parameter set $\theta_1$ obtained in the first detector 1. As another example, the acquisition function 150a of the processing circuitry 150 can obtain, either in place of or in addition to the first photon-number information, temporal resolution $\sigma_s$ of the light sensor for the scintillation light as one of the parameters in the parameter set $\theta_1$ obtained in the first detector 1. As still another example, the acquisition function 150a of the processing circuitry 150 can obtain the excess noise occurrence probability as one of the parameters in the parameter set $\theta_1$ obtained in the first detector 1. The excess noise occurrence probability implies, for example, the probability of occurrence of optical crosstalk or APD excess noise (APD stands for Avalanche Photo Diode).

In an identical manner to Step S100, at Step S200, the acquisition function 150a of the processing circuitry 150 obtains, regarding the i-th coincidence counting event, the second photon-number information related to a second event detected by the second detector m that is different than the first detector 1.

The second photon-number information represents, for example, a scintillation photon number $N^i_{s;\,m}$ regarding the concerned coincidence counting event. As another example, the second photon-number information represents a Cerenkov photon number $N^i_{c;\,m}$ regarding the concerned coincidence counting event. As still another example, the second photon-number information represents the scintillation photon number $N^i_{s;\,m}$ and the Cerenkov photon number $N^i_{c;\,m}$ regarding the concerned coincidence counting event. That is, the acquisition function 150a of the processing circuitry 150 obtains, as the second photon-number information, either the scintillation photon number $N^i_{s;\,m}$ or the Cerenkov photon number $N^i_{c;\,m}$ or the scintillation photon number $N^i_{s;\,m}$ and the Cerenkov photon number $N^i_{c;\,m}$. Typically, the second photon-number information that is obtained by the acquisition function 150a of the processing circuitry 150 is obtained on an event-by-event basis.

The PET device 100 can obtain the second photon-number information based on the energy spectrum obtained by the second detector m.

Moreover, the acquisition function 150a of the processing circuitry 150 can obtain the following as a parameter set $\theta_m$ obtained in the second detector m: the temporal resolution $\sigma_c$ of the light sensor for the Cerenkov light; the temporal resolution $\sigma_s$ of the light sensor for the scintillation light; and the excess noise occurrence probability.

Subsequent to Step S100, at Step S300, based on the first photon-number information obtained at Step S100, the calculation function 150b of the processing circuitry 150 calculates, for the i-th coincidence counting event, a first light emission probability model $p_{r;\,l}^{i,\,(doi)}$ corresponding to the first detector 1. The calculation function 150b of the processing circuitry 150 sets, typically for each coincidence counting event, the first light emission probability model $p_{r;\,l}^{i,\,(doi)}$ with respect to the first detector 1. In the embodiment described below, it is assumed that the calculation function 150b of the processing circuitry 150 sets, for each coincidence counting event, the first light emission probability model $p_{r;\,l}^{i,\,(doi)}$ corresponding to the first detector 1. However, the embodiment is not limited to that example. Alternatively, the calculation function 150b of the processing circuitry 150 can set, only in the units of detectors, the first light emission probability model corresponding to the first detector 1.

Figure 5:
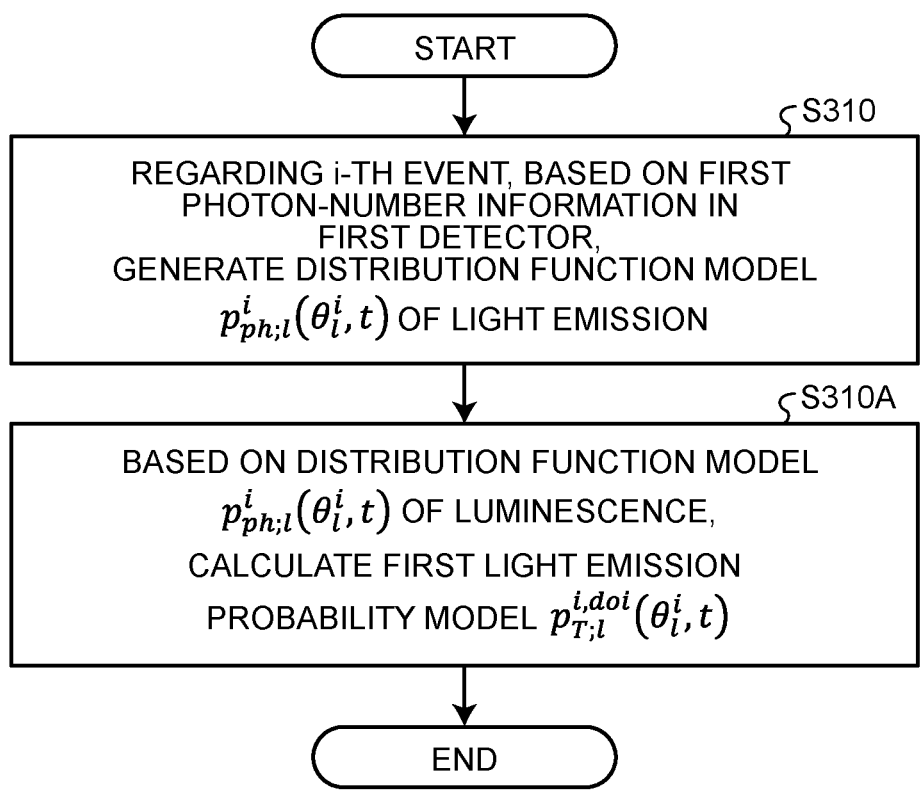
FIG. 5 is a flowchart for explaining in more detail an example of the operations performed at Step S300 illustrated in FIG. 3.

With reference to FIG. 5, an example of the operations performed at Step S300 is explained in more detail. FIG. 5 is a flowchart for explaining in more detail an example of the operations performed at Step S300.

At Step S310, the calculation function 150*b* of the processing circuitry 150 generates a distribution function model $p^i_{ph,\,l}(t)$ of the light emission at each timing based on the first photon-number information regarding the first detector l and obtained at Step S100. The distribution function $p_{ph}(t)$ of the light emission indicates the probability of occurrence of the light emission at the timing t. The distribution function model $p^i_{ph,\,l}(t)$ of the light emission becomes equal to "1" when timing-related integration is performed over the entire period of time. The distribution function model $p^i_{ph,\,l}(t)$ of the light emission is set for each detector and for each coincidence counting event.

Figure 6:
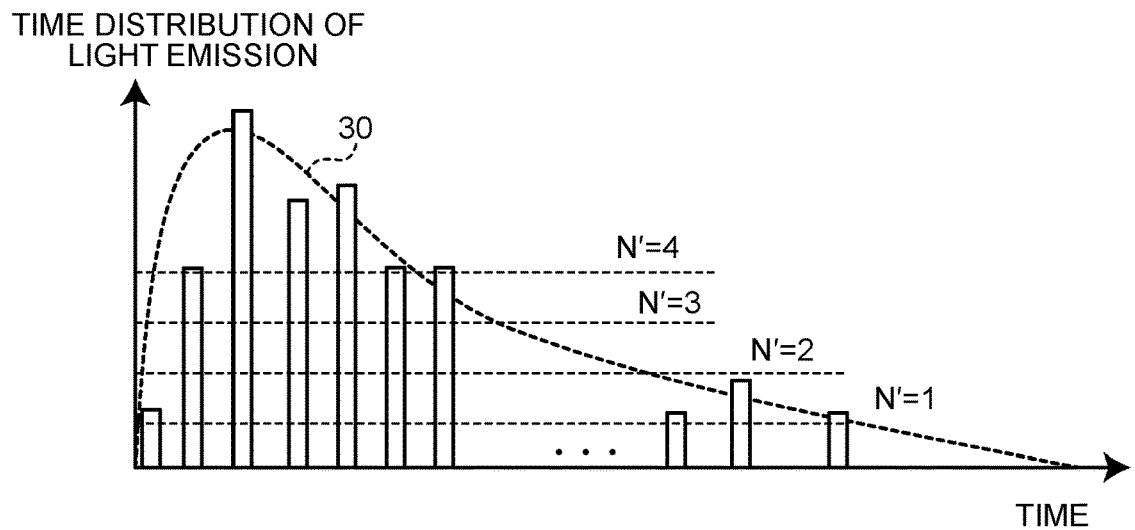
FIG. 6 is a diagram for explaining the operations performed in the nuclear medicine diagnostic device according to the embodiment.

Based on the first photon-number information and using, for example, Equations (1), (4), (5), and (6); the calculation function 150*b* of the processing circuitry 150 generates the distribution function model $p^i_{ph,\,l}(t)$ of the light emission. Since the first photon-number information is obtained for each detector and for each coincidence counting event, the calculation function 150*b* of the processing circuitry 150 calculates the distribution function model $p^i_{ph,\,l}(t)$ of the light emission for each detector and for each coincidence counting event. In FIG. 6 is illustrated an example of the distribution function model $p^i_{ph,\,l}(t)$ of the light emission. In FIG. 6, a curved line 30 represents the distribution function $p_{ph}(t)$ of the light emission. Moreover, a photon threshold value (N') meant for defining the detection timing is also illustrated.

Figure 7:
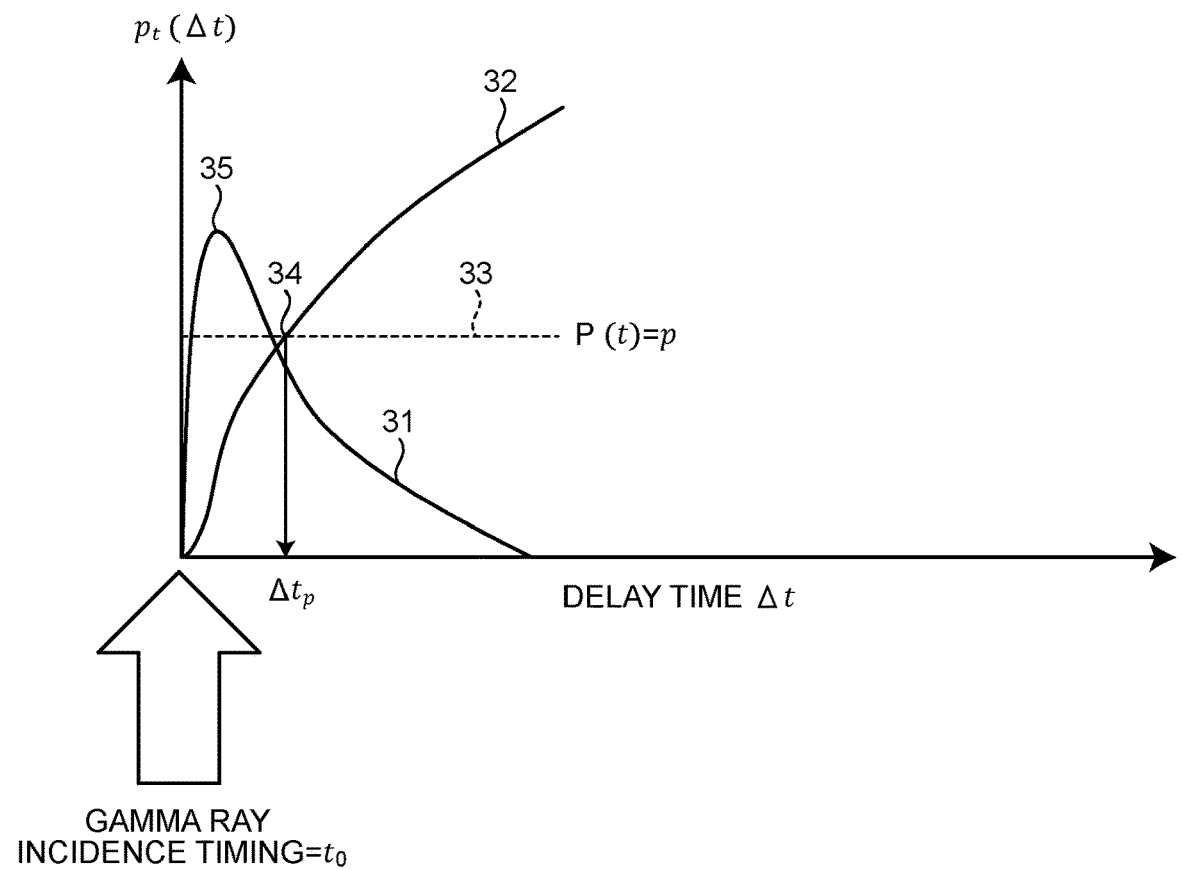
FIGS. 7 and 8 are diagrams for explaining the operations performed in the nuclear medicine diagnostic device according to the embodiment.

Then, at Step S320A, based on the distribution function model $p^i_{ph,\,l}(\theta^i_l,\,t)$ of the light emission, the calculation function 150*b* of the processing circuitry 150 calculates a first light emission probability model $p^i_{t,\,l}(\geq N',\,\theta^i_l,\,t)$, which is a model related to the probability density for detecting the number of photons equal to or greater than the first N' number of photons from among a plurality of photons included in the detection event. In other words, the first light emission probability model $p_{t,\,l}(\geq N',\,t)$ is related to the probability density meant for detecting a predetermined number of photons from among a plurality of photons included in the detection event. In FIG. 7 is illustrated the first light emission probability model $p_{t,\,l}(\Delta t)$. Herein, since the photon detection threshold value N' is fixed to a particular value, it is not illustrated in FIG. 7. In FIG. 7, a curved line 31 represents the sketch of the first light emission probability model $p_{t,\,l}(\Delta t)$. Meanwhile, the first light emission probability model $p_{t,\,l}(\Delta t)$ is set for each detector and for each coincidence counting event. In the following explanation, the suffix of a detector, the suffix indicating the number of a coincidence counting event, and the parameter $\theta^i_l$ representing the set of obtained parameters are omitted as may be necessary. A curved line 32 represents a cumulative distribution P(t) of the first light emission probability model $p_{t,\,l}(\Delta t)$. Regarding the curved line 32, the explanation is given later.

Given below is the explanation of a method for calculating the first light emission probability model $p_{t,\,l}(\geq N',\,t)$. Herein, the first light emission probability model $p_t(\geq N',\,t)$, which represents the probability density for detecting the number of photons equal to or greater than the first N' number of photons from among a plurality of photons included in the detection event, can be calculated in the following manner.

Firstly, an equation is derived in regard to a probability $P'(\geq N',\,t)$ of detection of photons smaller in number than N' till the timing t. Thus, the probability $P'(\geq N',\,t)$ represents the probability of detection of N'−1 number of photons at most till the timing t, and is expressed as given below in Equation (7) using a probability Pd(k, t) of detection k number of photons till the timing t.

$$P'(\geq N',\,t) = \sum_{k<N'} P_d(k,\,t) \tag{7}$$

As a result of evaluating the photon detection event according to the binomial distribution, the probability of detection of k number of photons till the timing t can be expressed in a differential form as given below in Equation (8).

$$\frac{d\left(P_d(k,\,t)e^{NP_{ph}(t)}\right)}{dt} = NP_d(k-1,\,t)e^{NP_{ph}(t)}p_{ph}(t) \tag{8}$$

When the differential equation is sequentially solved with respect to k=0, 1, 2, . . . ; Equation (9) given below is established in an inductive manner.

$$P_d(k,\,t) = \frac{N^k}{k!}F^k(t)e^{-NP_{ph}(t)} \tag{9}$$

According to Equation (7), the probability $P'(\geq N',\,t)$ of detection of photons smaller in number than N' till the timing t can be written as Equation (10) given below.

$$P'(\geq N',\,t) = \sum_{k<N'} \frac{N^k}{k!}F^k(t)e^{-NP_{ph}(t)} \tag{10}$$

When Equation (10) is substituted in Equation (8), the first light emission probability model $p_t(\geq N',\,t)$, which represents the probability density for detecting the number of photons equal to or greater than the first N' number of photons from among a plurality of photons included in the detection event, can be expressed as given below in Equation (11).

$$p_T(\geq N',\,t) = -\frac{dP'(\geq N',\,t)}{dt} = \frac{N^{N'}}{(N'-1)!}F^{N'-1}(t)p_{ph}(t)e^{-NP_{ph}(t)} \text{ for} \tag{11}$$

$$N' \geq 1$$

Herein, a function F(t) represents the cumulative distribution function of the distribution function $p_{ph}(t)$ of the light emission, and can be written as given below in Equation (12).

$$F(t) = \int_0^t p_{ph}(t')dt' \tag{12}$$

In a working example explained below, for ease of explanation, the explanation is given about the probability distribution evaluated at the timing of detecting photons for the first time. That is, the following explanation is given about the example in which N'=0 holds true. Thus, it is assumed that a first light emission probability model $p_t(t)$ represents the probability density of initial detection of photons, and is expressed as given below in Equation (13).

$$p_r(t) = N p_{ph}(t) \exp(-NF(t)) \qquad (13)$$

That is, using Equations (12) and (13) and based on the distribution function $p_{ph}(t)$ of the light emission, the calculation function 150b of the processing circuitry 150 can calculate the first light emission probability model $p_r(t)$. In this way, the calculation function 150b of the processing circuitry 150 substitutes, in Equations (12) and (13), the distribution function model $p_{ph}(t)$ of the light emission regarding a first detector; substitutes the first photon-number information in "N" of the right-hand side of Equation (13) and evaluates the right-hand side of Equation (13); and, based on the first photon-number information and based on the distribution model $p_{ph}(t)$ of the light emission regarding the first detector as set for each coincidence counting event, calculates the first light emission probability model $p_r(t)$ regarding the first event.

Meanwhile, the distribution function $p_{ph}(t)$ of the light emission as well as the first light emission probability model $p_r(t)$ can be set for each detector and for each coincidence counting event. Thus, if the suffix of the detector and the suffix related to the coincidence counting event are explicitly written, then Equation (13) can be written as given below in Equation (14).

$$p_{T;l}^{i}(t) = \qquad (14)$$
$$\left(N_{s;l}^{i} + N_{c;l}^{i}\right) p_{ph;l}^{i}\left(N_{s;l}^{i}, N_{c;l}^{i}, t\right) \exp\left(-\left(N_{s;l}^{i} + N_{c;l}^{i}\right) \int_{0}^{t} p_{ph;l}^{i}\left(N_{s;l}^{i}, N_{c;l}^{i}, t'\right) dt'\right)$$

Herein, $p^i_{T;l}(t)$ represents the first light emission probability model in the detector l for the i-th coincidence counting event; $p^i_{ph;l}(t)$ represents the distribution function of the light emission in the detector l for the i-th coincidence counting event; $N^i_{s;l}$ represents the photon number of the scintillation light in the detector l for the i-th coincidence counting event; and $N^i_{c;l}$ represents the photon number of the Cerenkov light in the detector l for the i-th coincidence counting event.

Figure 8:
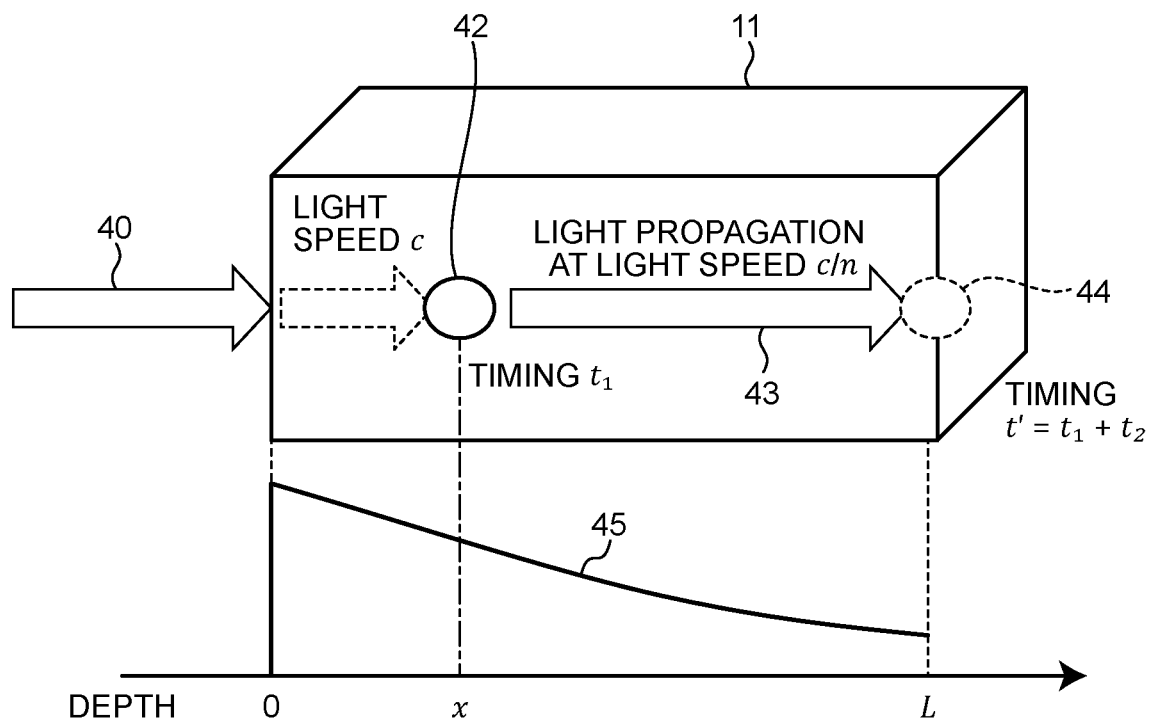

Meanwhile, at the time of calculating the first light emission probability model, the calculation function 150b of the processing circuitry 150 can perform calculation by taking into account the uncertainty of the light emission position inside the scintillator. For example, as illustrated in FIG. 8, a gamma ray 40 produces light emission at a point 42 that is present at a depth x in the scintillator 11; and, as indicated by an arrow 43, when the scintillator light propagates through the medium having a refractive index n at a light speed of c/n inside the material and reaches an end 44 of the scintillator 11, the timing at which the gamma ray 40 reaches the end of the scintillator 11 since falling on the scintillator 11 differs according to the light emission position inside the scintillator 11. Accordingly, the timing of detection of signals also differs.

That is, a timing ti at which the gamma ray 40 reaches the point at the depth x since falling on the scintillator 11 is obtained as given below in Equation (15).

$$t_1 = \frac{x}{c} \qquad (15)$$

Moreover, a timing $t_2$ at which the light emitted at the point 42 reaches the end of the scintillator 11 from the depth x is obtained as given below in Equation (16).

$$t_2 = \frac{L - x}{\frac{c}{n}} \qquad (16)$$

Thus, a timing t' at which the scintillator light reaches the end of the scintillator 11 since the incidence of the gamma ray 40 on the scintillator 11 is obtained as given below in Equation (17).

$$t' = t_1 + t_2 = \frac{nL - (n-1)x}{c} \qquad (17)$$

According to Equation (17), it can be understood that the timing of detection of signals differs according to the light emission position x inside the scintillator 11.

In this way, based on Equation (13), regarding the formulation in which the light emission position x inside the scintillator 11 is taken into account, in the case of thinking about the treatment by taking into account the light emission position x inside the scintillator 11, Equation (18) given below is established.

$$p_{T;l}^{i,doi}(t) = \left(N_{s;l}^{i} + N_{c;l}^{i}\right) p_{ph;l}^{i,doi}\left(N_{s;l}^{i}, N_{c;l}^{i}, t\right) \qquad (18)$$
$$\exp\left(-\left(N_{s;l}^{i} + N_{c;l}^{i}\right) \int_{0}^{t} p_{ph;l}^{i,doi}\left(N_{s;l}^{i}, N_{c;l}^{i}, t'\right) dt'\right)$$

Herein, $p_{T;l}^{i,doi}(t)$ represents the first light emission probability model which is set for each coincidence counting event and in which the uncertainty of the light emission position inside the scintillator is taken into account. Moreover, $p_{ph;l}^{i,doi}(t)$ represents a distribution function model of the light emission which is set for each coincidence counting event and in which the uncertainty of the light emission position of the scintillator is taken into account.

Meanwhile, if the parameter $\theta_l$ that is obtained by the acquisition function 150a of the processing circuitry 150 at Step S100 is explicitly expressed as an argument to the function, then Equation (18) can also be written as Equation (19) or Equation (20) given below.

$$\theta_l^i = \left(N_{c;l}^{i}, N_{s;l}^{i}, \sigma_{c;l}^{i}, \sigma_{s;l}^{i} \ldots\right) \qquad (19)$$

$$p_{T;l}^{i,doi}\left(\theta_l^i, t\right) = \left(N_{s;l}^{i} + N_{c;l}^{i}\right) p_{ph;l}^{i,doi}\left(\theta_l^i, t\right) \exp\left(-\left(N_{s;l}^{i} + N_{c;l}^{i}\right) \int_{0}^{t} p_{ph;l}^{i,doi}\left(\theta_l^i, t'\right) dt'\right) \qquad (20)$$

Herein, $\theta_l^i$ represents the parameter set that is set for each coincidence counting event and that is obtained in the detector l. For example, $\theta_l^i$ represents the set of following parameters: the scintillation photon number $N^i_{s;l}$ set for each coincidence counting event; the Cerenkov photon number $N^i_{c;l}$ set for each coincidence counting event; the temporal resolution $\sigma^i_c$ of the light sensor for the Cerenkov light; and the temporal resolution $\sigma^i_s$ of the light sensor for the scintillation light.

Figure 9:
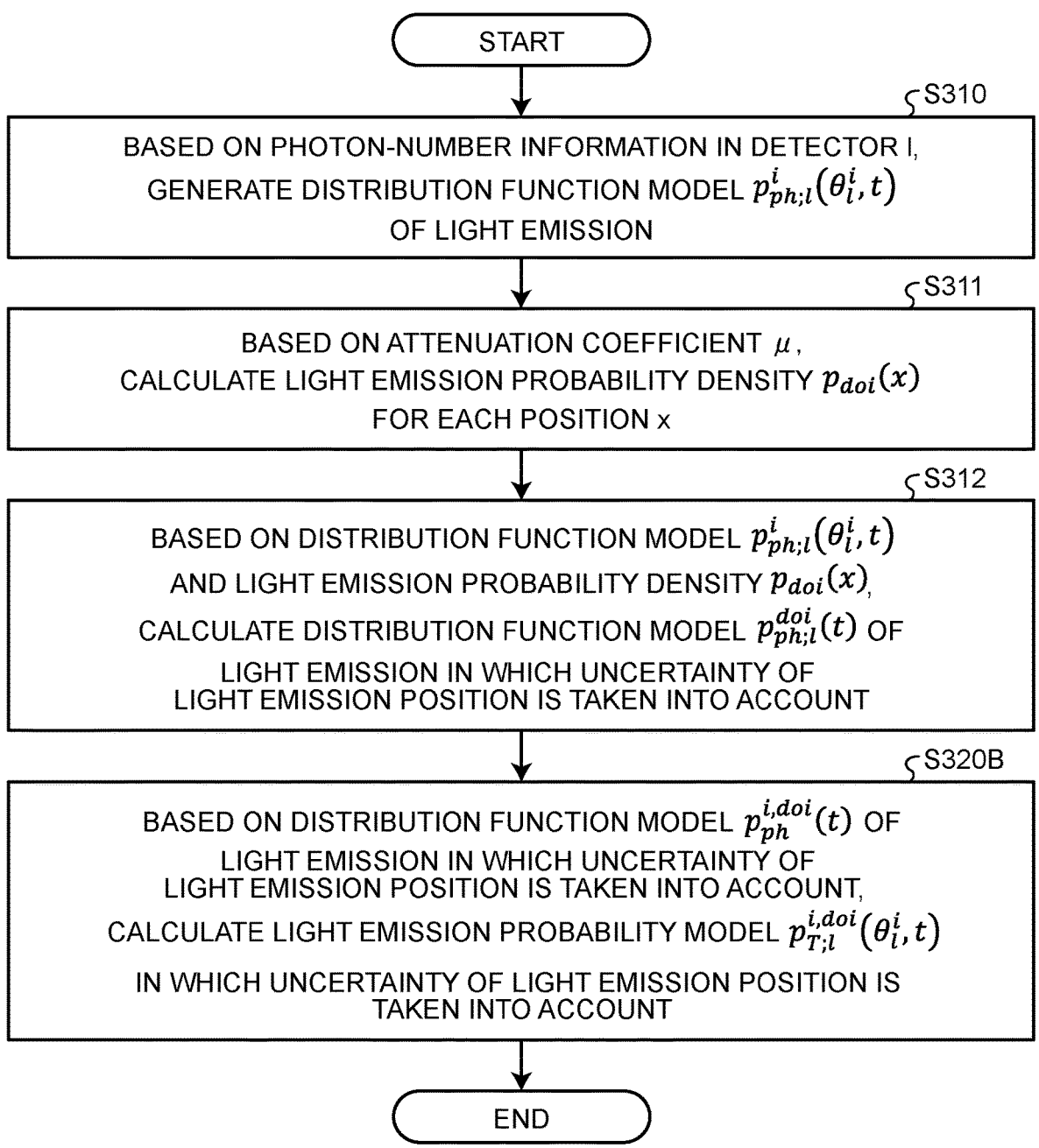
FIG. 9 is a flowchart for explaining in more detail another example of the operations performed at Step S300 illustrated in FIG. 3.

Returning to the explanation with reference to Equation (18), the following explanation is given about the operation performed at Step S300 in the case of taking into account the uncertainty of the light emission position inside the scintillator. FIG. 9 is a flowchart for explaining a flow of calculating the light emission probability model in the case of taking into account the uncertainty of the light emission position inside the scintillator.

In an identical manner to the case illustrated in FIG. 5, at Step S310, the calculation function 150b of the processing circuitry 150 generates the distribution function model $p_{ph,\,l}(t)$ of the light emission based on the parameter $\theta_l$ of the first photon-number information in the first detector 1.

Then, at Step S311, the calculation function 150b of the processing circuitry 150 calculates, for each position x inside the scintillator, a light emission probability density $p_{doi}(x)$ based on an attenuation coefficient µ. The light emission probability density $p_{doi}(x)$ at each position x is expressed as given below in Equation (21).

$$p_{doi}(x) = \frac{\mu\exp(-\mu x)}{1 - \exp(-\mu L)} \tag{21}$$

The light emission probability density $p_{doi}(x)$ is standardized as given below in Equation (22).

$$\int_0^L p_{doi}(x)dx = 1 \tag{22}$$

Meanwhile, a graph 45 illustrated in FIG. 8 represents an attenuation rate µexp(−µx).

Returning to the explanation with reference to FIG. 9, at Step S312, based on the distribution function model $p^i_{ph,\,l}(t)$ that is generated at Step S310 and that represents the distribution function of the light emission as set for each coincidence counting event based on the light emission probability density $p_{doi}(x)$; the calculation function 150b of the processing circuitry 150 calculates, as the first light emission probability model, the distribution function model $p_{ph;\,l}^{i,doi}(t)$ of the light emission which is set for each coincidence counting event and in which the uncertainty of the light emission position is taken into account.

More particularly, based on the distribution function model $p^i_{ph,\,l}(t)$ generated at Step S310 and based on the light emission probability density $p_{doi}(x)$ calculated at Step S311, the calculation function 150b of the processing circuitry 150 calculates the distribution function model $p^{i,\,doi}_{ph;\,l}(t)$ of the light emission, in which the uncertainty of the light emission position is taken into account, as given below in Equation (23).

$$p_{ph}^{i,doi}(t) = \int_0^L p_{doi}(x)p_{ph}^i(t-t')dx \tag{23}$$

Herein, L represents the length of the scintillator; x represents the light emission position; t' represents, as explained earlier with reference to Equation (17), the delay time taken by the scintillator light to reach the end of the scintillator since the incidence of the gamma rays.

Subsequently, at Step S320B, based on the distribution function model $p^{i,\,doi}_{ph;\,l}(t)$ of the light emission in which the uncertainty of the light emission position is taken into account, the calculation function 150b of the processing circuitry 150 calculates the light emission probability model $p^{i,\,doi}_{t;l}(\theta_l;\,t)$ in which the same uncertainty of the light emission position is taken into account. More particularly, as given below in Equation (24) and Equation (25), in an identical manner to Equation (13), based on a distribution function model $p^{i,\,doi}_{ph}(t)$ of the light emission in which the uncertainty of the light emission position is taken into account, the calculation function 150b of the processing circuitry 150 calculates a light emission probability model $p^{i,doi}_t(t)$ in which the uncertainty of the light emission position is taken into account.

$$p_t^{i,doi}(t) = Np_{ph}^{i,doi}(t)\exp(-NF^{i,doi}(t)) \tag{24}$$

$$F^{i,doi}(t) = \int_0^t p_{ph}^{i,doi}(t')dt' \tag{25}$$

Meanwhile, in Equation (23), if x of the integrand is variable-transformed into t' based on Equation (18), then Equation (26) given below is obtained. Hence, in the evaluation of the right-hand side of Equation (25), the calculation function 150b of the processing circuitry 150 can perform the calculation using Equation (26).

$$p_{ph}^{i,doi}(t) = \frac{c}{n-1}\int_{\frac{L}{c}}^{\frac{nL}{c}} p_{doi}\left(\frac{nL-ct'}{n-1}\right)p_{ph}^i(t-t')dt' \tag{26}$$

In this way, the calculation function 150b of the processing circuitry 150 takes into account the uncertainty of the light emission position inside the scintillator, and calculates a first light emission probability model and a second light emission probability model.

Returning to the explanation with reference to FIG. 3, at Step S400, the calculation function 150b of the processing circuitry 150 performs an identical operation to the operation performed at Step S300 and, based on the second photon-number information obtained at Step S200, calculates a second light emission probability model $p^{i,\,(doi)}_{t;\,m}$ that is set for each coincidence counting event with respect to the second detector m.

More particularly, based on the second photon-number information that is set for each coincidence counting event in the second detector m and that is obtained at Step S200, the calculation function 150b of the processing circuitry 150 uses equations equivalent to, for example, Equations (1), (4), (5), and (6) and generates a distribution function model $p^i_{ph;\,m}(t)$ of the light emission set for each coincidence counting event.

Then, based on the second photon-number information and based on the distribution function model $p^i_{ph;\,m}(t)$ in the second detector m, the calculation function 150b of the processing circuitry 150 uses an equation equivalent to, for example, Equation (14) and calculates a second light emission probability model $p^i_{t;\,m}(t)$ set for each coincidence counting event.

Meanwhile, at the time of calculating the second light emission probability model, the calculation function 150b of the processing circuitry 150 can use identical equations to Equation (17) and Equations (21) to (26) and perform the calculation by taking into account the uncertainty of the light emission position inside the scintillator. In that case, the calculation function 150b of the processing circuitry 150 calculates, for each position x inside the scintillator, the light emission probability density $p_{doi}(x)$ using the value of the attenuation coefficient µ. Then, based on the distribution function model $p^i_{ph;\,m}(t)$ set for each coincidence counting event and based on the light emission probability density $p_{doi}(x)$, the calculation function 150b of the processing circuitry 150 calculates a distribution function model $p^{i,\,doi}_{ph;\,m}(t)$ of the light emission which is set for each coincidence counting event and in which the uncertainty of the light emission position is taken into account. Subsequently, based on the distribution function model $p^{i,\,doi}_{ph;\,m}(t)$ of the light emission which is set for each coincidence counting event and in which the uncertainty of the light emission position is taken into account, the calculation function 150b of the processing circuitry 150 calculates a light emission probability model $p^{i,\,doi}_{t;\,m}(t)$ which is set for each coincidence counting event and in which the uncertainty of the light emission position is taken into account.

In this way, the calculation function 150b of the processing circuitry 150 takes into account the light emission position inside the scintillator and calculates the second light emission probability model $p_{t,\,m}(t)$ set for each coincidence counting event.

Subsequently, at Step S410, based on the first light emission probability model, the identification function 150c of the processing circuitry 150 identifies a first timing at which the light emission detection probability is equal to or greater than a predetermined threshold value. As an example, based on the first light emission probability model calculated at Step S300, the identification function 150c of the processing circuitry 150 identifies an event-by-event estimated detection delay time $\Delta t^{l,\,i}p$ as the first timing.

The estimated detection delay time represents, for example, the estimated value of the period of time required for the detection of light emission signals since the incidence of X-rays onto the scintillator. Herein, the identification function 150c of the processing circuitry 150 can estimate the estimated detection delay time for each detector and for each coincidence counting event. As a result of estimating the estimated detection delay time and deducting it from the detection timing, the processing circuitry 150 enables sharpening of the ToF spectrum and enables achieving enhancement in the image quality.

Regarding the identification of the first timing, the explanation is given again with reference to FIG. 7. As a first method for identifying the first timing at which the light emission detection probability becomes equal to or greater than a predetermined threshold value, based on the cumulative distribution P(t) of the distribution indicated by the first light emission probability model $p^{i,doi}_{t;\,l}(\theta_l;\,t)$ the identification function 150c of the processing circuitry 150 identifies the first timing at which the light emission detection probability becomes equal to or greater than a predetermined threshold value. The cumulative distribution P(t) of the distribution indicated by the first light emission probability model $p^{i,doi}_{t;\,l}(\theta_l;\,t)$ is, for example, given below in Equation (27).

$$P(\Delta t) = \int_0^{\Delta t} p^{i,doi}_{t;l}(\theta_l, t)dt \qquad (27)$$

Herein, the identification function 150c of the processing circuitry 150 identifies, as a first timing $\Delta t_p^{l,\,i}$, the timing at which the cumulative distribution P(t) of the distribution indicated by the first light emission probability model $p^{i,doi}_{t;\,l}(\theta_l;\,t)$ reaches a predetermined threshold value p, that is, a timing 34 at which the curved line 32 and a straight line 33 intersect. When expressed in an equation, the first timing $\Delta t_p^{l,\,i}$ is given below in Equation (28).

$$\Delta t_p^{l,i} \text{ such that } P(\Delta t_p^{l,i}) = p \qquad (28)$$

As a second method for identifying the first timing at which the light emission detection probability becomes equal to or greater than a predetermined threshold value, the identification function 150c of the processing circuitry 150 identifies, as the first timing $\Delta t_p^{l,\,i}$, a timing 35 at which the distribution indicated by the first light emission probability model $p^{i,doi}_{t;\,l}(\theta_l;\,t)$ exhibits the extreme value. When expressed in an equation, the first timing $\Delta t_p^{l,\,i}$ is given below in Equation (29).

$$\Delta t_p^{l,i} \text{ such that } p^{i,doi}_{t;l}(\theta_l^i, \Delta t_p^{l,i}) \text{ is maximized} \qquad (29)$$

Typically, the identification function 150c of the processing circuitry 150 identifies the first timing $\Delta t_p^{l,\,i}$ for each coincidence counting event and for each detector. However, the embodiment is not limited to that example. Alternatively, the identification function 150c of the processing circuitry 150 can identify the first timing, at which the light emission detection probability becomes equal to or greater than a predetermined threshold value, in units other than units of events or units of detectors.

Returning to the explanation with reference to FIG. 3, in an identical manner to Step S410, at Step S420, based on the second light emission probability model, the identification function 150c of the processing circuitry 150 identifies a second timing at which the light emission detection probability becomes equal to or greater than a predetermined threshold value. As an example, based on the second light emission probability model calculated at Step S300, the identification function 150c of the processing circuitry 150 identifies an event-by-event estimated detection delay time $\Delta t^{m,\,i}_p$ as the second timing.

As a first method for identifying the second timing at which the light emission detection probability becomes equal to or greater than a predetermined threshold value, based on the cumulative distribution P(t) of the distribution indicated by the second light emission probability model $p^{i,doi}_{t;\,m}(\theta_m;\,t)$, the identification function 150c of the processing circuitry 150 identifies the second timing at which the light emission detection probability becomes equal to or greater than a predetermined threshold value. As an example, the identification function 150c of the processing circuitry 150 identifies, as the second timing $\Delta t_p^{m,\,i}$, the timing at which the cumulative distribution P(t) of the distribution indicated by the second light emission probability model $p^{i,doi}_{t;\,m}(\theta_m;\,t)$ reaches the predetermined threshold value p.

As a second method for identifying the second timing at which the light emission detection probability becomes equal to or greater than a predetermined threshold value, the identification function 150c of the processing circuitry 150 identifies, as the second timing $\Delta t_p^{m,\,i}$, the timing at which the distribution indicated by the second light emission probability model $p^{i,doi}_{t;\,m}(\theta_m;\,t)$ exhibits the extreme value.

At Step S450, based on the first timing $\Delta t_p^{l,\,i}$ estimated at Step S410, the correction function 150e of the processing circuitry 150 performs detection timing correction regarding the event that is detected by the detector 1 and that is associated to the i-th coincidence counting event. Herein, a post-correction detection timing $t^{l,\,i}_{corrected}$ is expressed using Equation (30) given below and using a pre-correction detection timing $t^{l,\,i}_d$ and the first timing $\Delta t_p^{l,\,i}$ identified at Step S410.

$$t_{corrected}^{l,i} = t_d^{l,i} - \Delta t_p^{l,i} \qquad (30)$$

In other words, in the processing circuitry 150, the measurement function 150d measures a detection timing $t^{l,\,i}_{d}$ of the event detected by the first detector l, and the correction function 150e performs detection timing correction $t^{l,\,i}_{d}$ based on the first timing $\Delta t_p^{l,\,i}$ and obtains the post-correction detection timing $t^{l,\,i}_{corrected}$.

Along with that, the correction function 150e of the processing circuitry 150 calculates the first light emission probability model $p^{i,\,doi}_{r;\,l;\,corrected}(\theta_l;\,t)$ in which the detection timing is corrected. The relationship between the post-correction first light emission probability model $p^{i,\,doi}_{r;\,l;\,corrected}(\theta_l;\,t)$ and the pre-correction first light emission probability model $p^{i,\,doi}_{r;\,l}(\theta_l;\,t)$ can be expressed, for example, using Equation (31) given below.

$$p^{i,doi}_{r;l;corrected}(\theta_l^i, t) = p^{i,doi}_{r;l}(\theta_l^i, t - \Delta t_p^{l,i}) \qquad (31)$$

Meanwhile, for ease of explanation, in the operations performed after Step S500, the post-correction first light emission probability model $p^{i,\,doi}_{r;\,l;\,corrected}(\theta_l;\,t)$ is simply referred to as the first light emission probability model $p^{i,\,doi}_{r;\,l}(\theta_l;\,t)$. Thus, in the subsequent operation of calculating a probability distribution model related to the coincidence, the first light emission probability model $p^{i,\,doi}_{r;\,l}(\theta_l;\,t)$ implies the post-correction first light emission probability model $p^{i,\,doi}_{r;\,l;\,corrected}(\theta_l;\,t)$.

At Step S460, an identical operation to Step S450 is performed and, based on the second timing $\Delta t_p^{m,\,i}$ estimated at Step S400, the correction function 150e of the processing circuitry 150 performs detection timing correction regarding the event that is detected by the detector m and that is associated to the i-th coincidence counting event. That is, in the processing circuitry 150, the measurement function 150d measures a detection timing $t^{m,\,i}_{d}$ of the event detected by the first detector l, and the correction function 150e corrects the detection timing $t^{m,\,i}_{d}$ based on the second timing $\Delta t_p^{m,\,i}$ and obtains the post-correction detection timing $t^{m,\,i}_{corrected}$.

Along with that, the correction function 150e of the processing circuitry 150 calculates the second light emission probability model $p^{i,\,doi}_{r;\,m;\,corrected}(\theta_m;\,t)$ in which the detection timing is corrected. In the operations performed after Step S500, the post-correction second light emission probability model $p^{i,\,doi}_{r;\,m;\,corrected}(\theta_m;\,t)$ is simply referred to as the second light emission probability model $p^{i,\,doi}_{r;\,m}(\theta_m;\,t)$. Thus, in the subsequent operation of calculating a probability distribution model related to the coincidence, the second light emission probability model $p^{i,\,doi}_{r;\,m}(\theta_m;\,t)$ implies the post-correction second light emission probability model $p^{i,\,doi}_{r;\,m;\,corrected}(\theta_m;\,t)$.

Subsequently, at Step S500, based on the first light emission probability model $p_{r;\,l}^{doi}(t_1)$ calculated at Step S300 and based on the calculated second light emission probability model $p_{r;\,m}^{doi}(t_2)$, the calculation function 150b of the processing circuitry 150 identifies a probability distribution model $p^{i,\,ldoil}_{ct;\,l,\,m}(\theta_l,\,\theta_m,\,t)$ that is identified for each coincidence counting event and that is related to the coincidence defined based on the first event and the second event.

Figure 10:
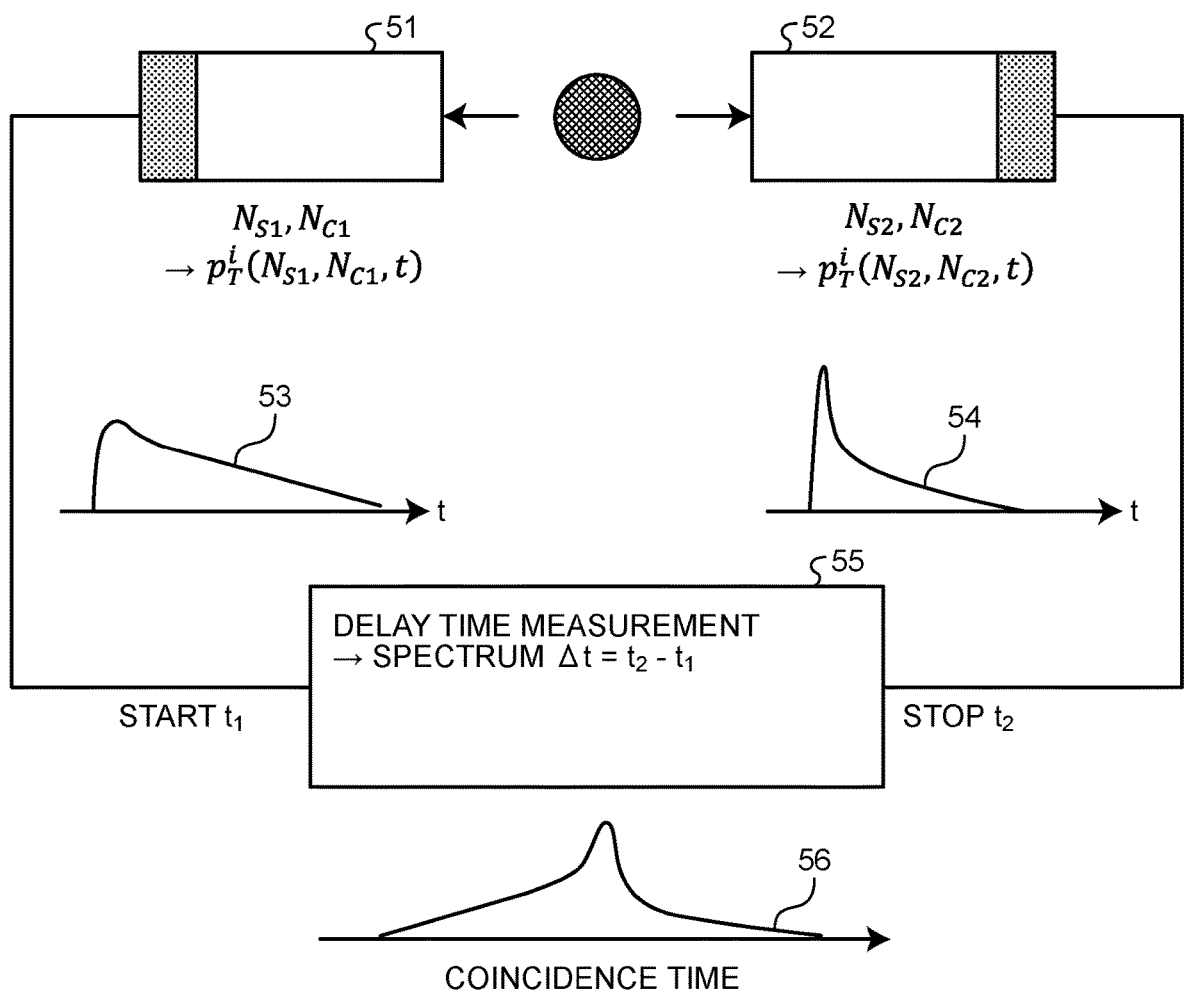
FIG. 10 is a diagram for explaining the operations performed in the nuclear medicine diagnostic device according to the embodiment.

In FIG. 10, a curved line 53 represents the plotting of the first light emission probability model $p^{i,\,doi}_{r;\,l}(\theta_l,\,t_l)$, which is set for each coincidence counting event in a scintillator 51 of the first detector l, as a function of the delay time ti. Moreover, a curved line 54 represents the plotting of the second light emission probability model $p^{i,\,doi}_{r;\,m}(\theta_m,\,t_m)$, which is set in a scintillator 52 of the second detector m, as a function of the delay time $t_m$. The calculation function 150b of the processing circuitry 150 identifies a probability distribution model $p^{i,\,doi}_{ct;\,l,\,m}(\theta_l,\,\theta_m,\,t)$ which is set for each coincidence counting event and in which the event at the detection timing $t_l$ in the detector l and the product event at the detection timing $t_m$ in the detector m are expressed as functions of the detection-time difference. A curved line 56 represents an example of the probability distribution model $p^{i,\,doi}_{ct;\,l,\,m}(\theta_l,\,\theta_m,\,t)$.

During a duration dt, the number of events at the detection timing $t_l$ in the detector l and the number of product events at the detection timing $t_m$ in the detector m are given below in Equation (32).

$$p^{i,(doi)}_{r;l}(\theta_l^i, t_l) p^{i(doi)}_{r;m}(\theta_m^i t_m) dt \qquad (32)$$

Herein, $\theta^u_l$ represents the parameter set obtained in the detector l in regard to the i-th coincidence counting event. Moreover, if the parameter θ is expressed in a more specific form, then Equation (33) given below is established.

$$p^{i,(doi)}_{r;l}(N_{s;l}^i, N_{c;l}^i, t_l) p^{i(doi)}_{r;m}(N_{s;m}^i, N_{c;m}^i, t_m) dt \qquad (33)$$

Herein, $N^i_{s;\,l}$ and $N^i_{s;\,m}$ represent the scintillation photon number in the detectors l and m, respectively, in regard to the i-th coincidence counting event; and $N^i_{c;\,l}$ and $N^i_{c;\,m}$ represent the Cerenkov photon number in the detectors l and m, respectively, in regard to the i-th coincidence counting event.

The detection-time difference between the detection timing $t_l$ in the detector l and the detection timing $t_m$ in the detector m is obtained as given below in Equation (34).

$$t = t_l - t_m \qquad (34)$$

Accordingly, the probability distribution model $p^{i,\,doi}_{ct;\,l,\,m}(\theta_l,\,\theta_m,\,t)$ is obtained as given below in Equation (35).

$$\left(p^{i,(doi)}_{ct;l,m}(\theta_l^i, \theta_{m,}^i t) = \int_0^\infty p^{i,(doi)}_{T;l}(\theta_l^i, t') p^{i,(doi)}_{T;m}(\theta_m^i, t' - t) dt' \right. \qquad (35)$$

Moreover, if the parameter θ is expressed in a more specific form, then Equation (36) given below is established.

$$p^{i,(doi)}_{ct;l,m}(N_{s;l}^i, N_{c;l}^i, N_{s;m}^i, N_{c;m}^i, t) = \qquad (36)$$
$$\int_0^\infty p^{i,(doi)}_{T;l}(N_{s;l}^i, N_{c;l}^i, t') p^{i,(doi)}_{T;m}(N_{s;m}^i, N_{c;m}^i, t' - t) dt'$$

Returning to the explanation with reference to FIG. 2, at Step S30, the calculation function 150b of the processing circuitry 150 calculates a probability distribution model $p^{i,\,doi}_{ct;\,l,\,m}(\theta^i_l,\,\theta^i_m,\,t)$, which is related to the detection-time difference of the LOR defined by the first detector l and the second detector m, in regard to the i-th coincidence counting event. The processing circuitry 150 performs this operation regarding all coincidence counting event and adds all probability distribution models so as to calculate a final probability distribution model $p^{doi}_{ct;\ l,\ m}(\theta^i_l, \theta^i_m, t)$ that is related to the detection-time difference of the LOR defined by the first detector l and the second detector m. Based on that, it becomes possible to perform data reconstruction.

At Step S40, the calculation function 150b of the processing circuitry 150 determines whether or not the operation at Step S30 has been completed for all coincidence counting events. If the calculation function 150b of the processing circuitry 150 determines that the operation at Step S30 is yet to be completed for all coincidence counting events (No at Step S40), then the system control proceeds to Step S50, and the operations are performed for the i+1-th set of data. When the calculation function 150b of the processing circuitry 150 determines that the operation at Step S30 has been completed for all coincidence counting events (Yes at Step S40), the system control proceeds to Step S60.

At Step S60, the calculation function 150b of the processing circuitry 150 adds the probability distribution model $p^{i,\ doi}_{ct;\ l,\ m}(\theta^i_l, \theta^i_m, t)$ calculated for each coincidence counting event, and generates a probability distribution model $p^{tot}_{ct;\ l,\ m}$ related to the coincidence in the first detector l and the second detector m.

More particularly, the probability distribution model $p^{tot}_{ct;\ l,\ m}$ related to the coincidence in the first detector l and the second detector m is expressed in Equation (37) given below.

$$p^{tot}_{ct;l,m}(t) = \sum_i p^{i,(doi)}_{ct;l,m}(\theta^i_l, \theta^i_{m},t) \qquad (37)$$

Then, at Step S70, the reconstruction function 150f of the processing circuitry 150 uses the probability distribution model $p^{tot}_{ct;\ l,\ m}$, which is identified at Step S60 and which is related to the coincidence defined based on the first photon-number information and the second photon-number information, as the ToF kernel; and reconstructs the data corresponding to the LOR between the first detector l and the second detector m.

In FIGS. 11 to 14 is illustrated the verification result regarding the method implemented according to the embodiment. In this verification, the threshold value p meant for calculating the first timing $\Delta t_p^{l,\ i}$ was varied to various values, and it was confirmed whether or not there is sharpening of the peak of the distribution of the radioactive material in the reconstructed image.

Figure 11:
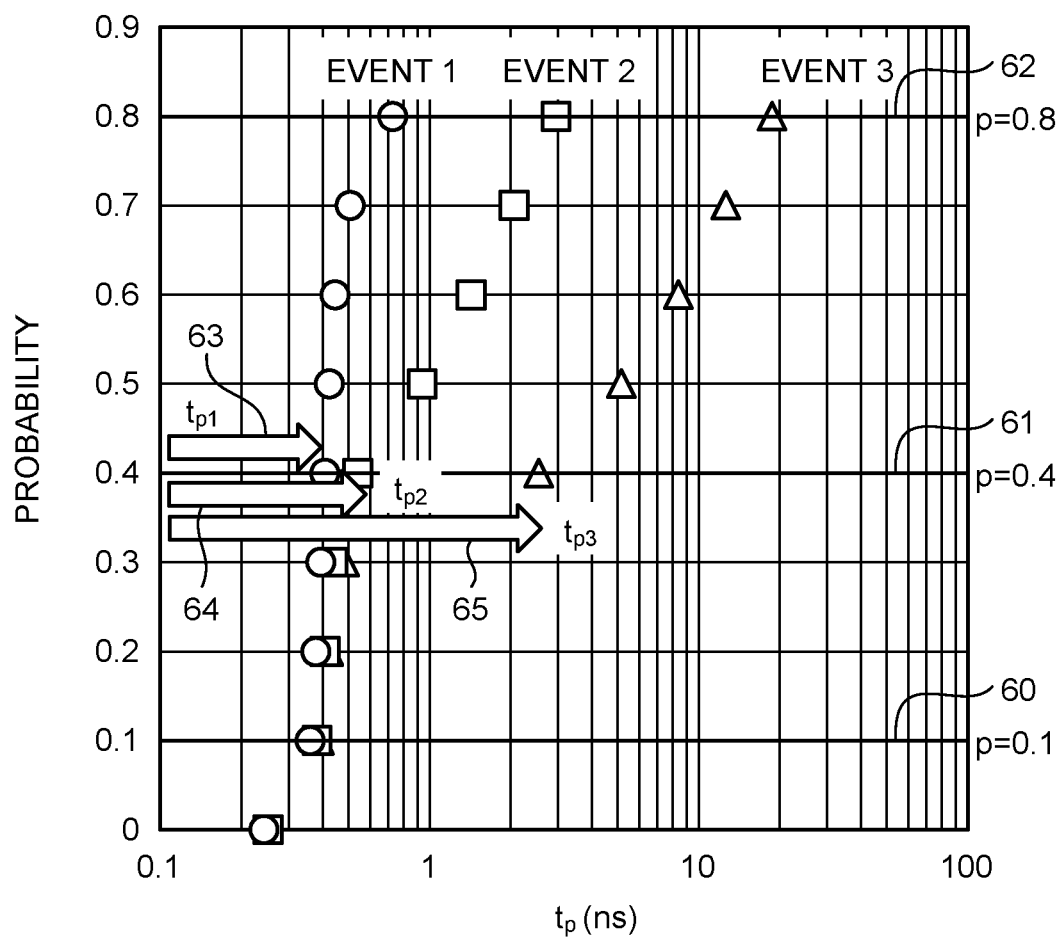
FIGS. 11 to 14 are diagrams for explaining an example of the calculation result according to the embodiment.

In FIG. 11 is illustrated the first light emission probability model $p^{i,\ doi}_{r,\ l}(\theta_l; t)$ regarding three events, namely, events 1, 2, and 3. Regarding those three events, the threshold value p in the right-hand side of Equation (28) was varied, and the first timing $\Delta t_p$ regarding each event was calculated. Herein, a straight line 60 corresponds to p=0.1, a straight line 61 corresponds to p=0.4, and a straight line 62 corresponds to p=0.8. Moreover, an arrow 63 represents a first timing $\Delta t_{p\_1}$ with respect to the event 1 when p=0.4 is set; an arrow 64 represents a second timing $\Delta t_{p\_2}$ with respect to the event 2 when p=0.4 is set; and an arrow 65 represents a first timing $\Delta t_{p\_3}$ with respect to the event 3 when p=0.4 is set.

Figure 12:
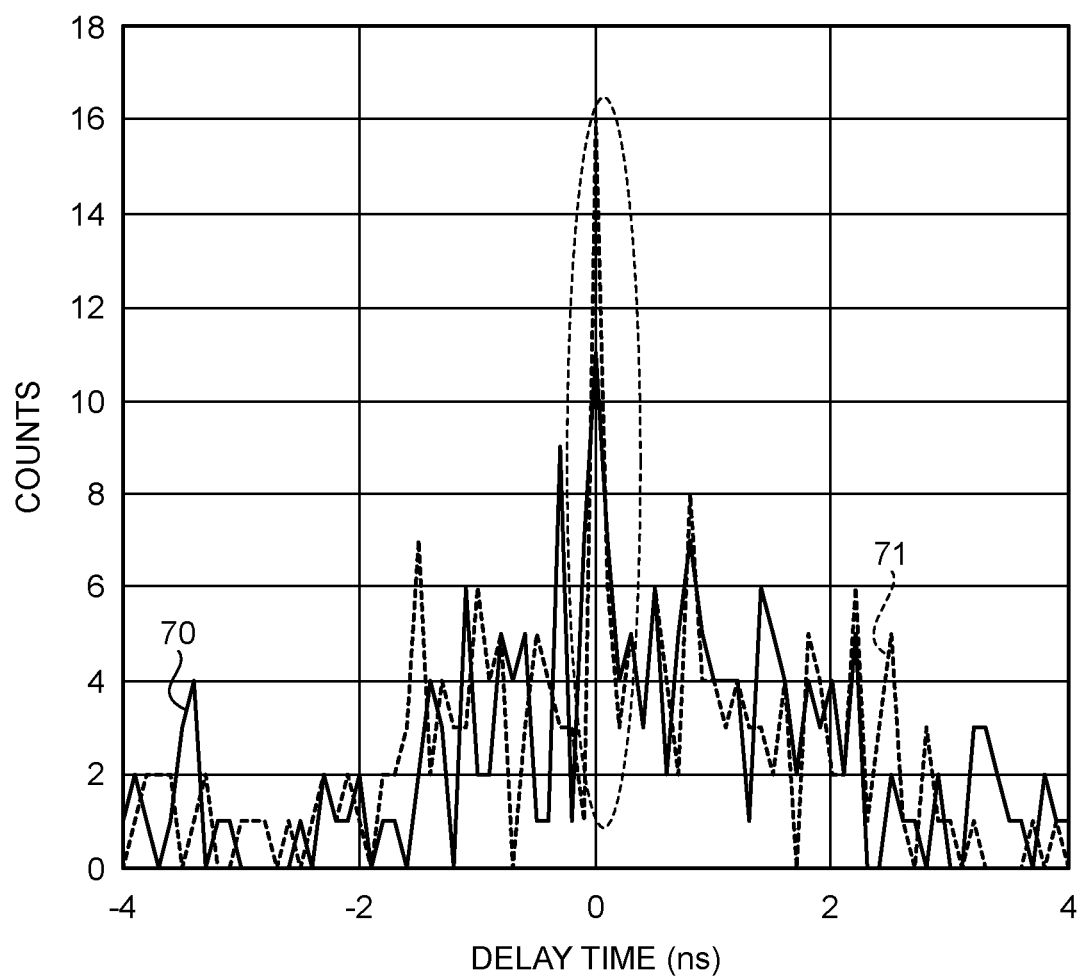

In FIG. 12 is illustrated the post-correction coincidence spectrum in the case in which p=0.4 and p=0.1 are set. A graph 71 represents the post-correction coincidence spectrum when p=0.4 is set, and a graph 70 represents the post-correction coincidence spectrum when p=0.1 is set. In the comparison of counts in the vicinity of the delay time of "0", when p=0.1 was set, the count was high but the range was also wide. In contrast, when p=0.4 was set, the count was high and the range also became smaller. Thus, when the threshold value is set close to p=0.4, the count increases and the range becomes smaller in the coincidence spectrum.

Figure 13:
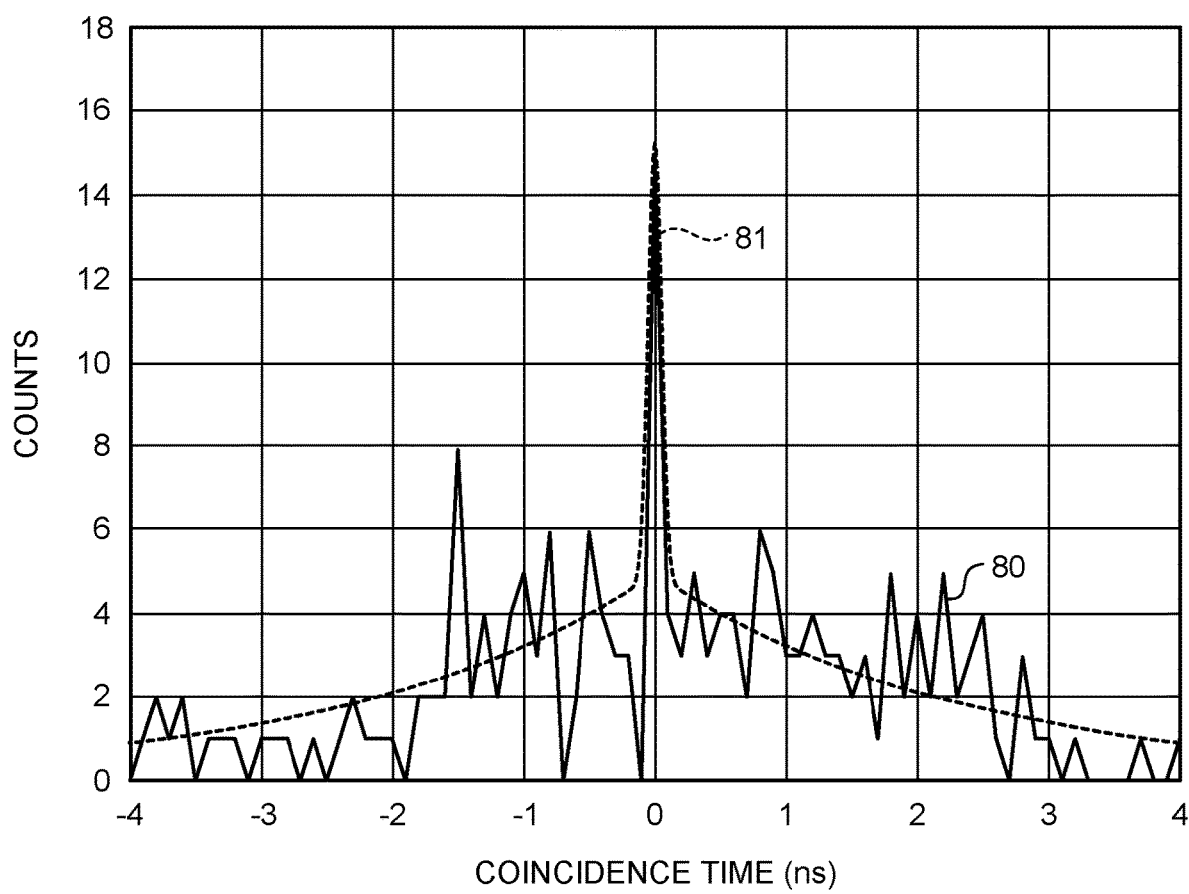
Figure 14:
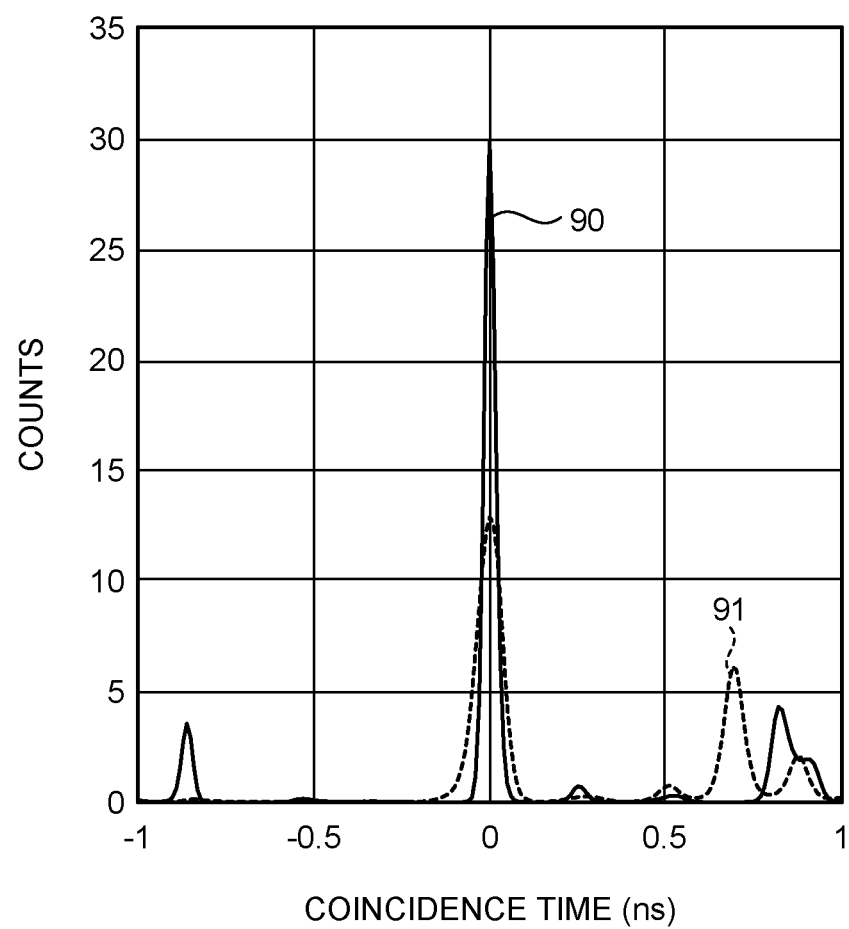

Furthermore, in the case of performing the correction according to the method implemented in the embodiment and in the case of not performing any correction, it was verified whether or not there is sharpening of the peak of the distribution of the radioactive material in the reconstructed image. Firstly, as illustrated in FIG. 13, a fitting curve 81 was generated with respect to actual measurement data 80, and the spectrum of the ToF kernel was identified. Then, based on the spectrum of the ToF kernel, reconstruction was performed according to ML-EM method. In FIG. 14 is illustrated the reconstruction result. A graph 90 represents the reconstruction result in the case in which correction was performed according to the method implemented in the embodiment, and a graph 91 represents the reconstruction result in the case in which correction was not performed according to the method implemented in the embodiment. When the graphs 90 and 91 are compared, it can be confirmed that the count approximately doubles in vicinity of the peak, and that there is sharpening of the peak of the distribution of the radioactive material.

As explained above, in the embodiment, based on a light emission model, the delay timing since the incidence of gamma rays on a scintillator till the occurrence of light emission is estimated, and the ToF kernel is corrected based on the estimation result. As a result, it becomes possible to sharpen the ToF spectrum, and to enhance the image quality of the post-reconstruction PET images.

In regard to the embodiment described above, following notes are disclosed as an aspect of the invention and as selective features.

Note 1

A medical nuclear diagnostic device according to an aspect of the present invention includes an obtaining unit, a calculating unit, an identifying unit, a measuring unit and a correcting unit. The obtaining unit obtains first photon-number information detected by a first detector. Based on the first photon-number information, the calculating unit calculates a first light emission probability model corresponding to the first detector. Based on the first light emission probability model, the identifying unit identifies a first timing at which the detection probability becomes equal to or greater than a predetermined threshold value. The measuring unit measures the detection timing of an event detected by the first detector. The correcting unit corrects the detection timing based on the first timing.

Note 2

The first photon-number information can contain a scintillation photon number.

Note 3

The first photon-number information can contain a Cerenkov photon number.

Note 4

The identifying unit can identify the first timing based on the cumulative distribution of the distribution indicated by the first light emission probability model.

Note 5

The identifying unit can identify the first timing based on the timing at which the distribution indicated by the first light emission probability model exhibits the extreme value.

Note 6

The first light emission probability model can be related to the probability density for detecting initial photons from among a plurality of photons included in a detection event.

Note 7

The first light emission probability model can be related to the probability density for detecting a predetermined number of photons from among a plurality of photons included in a detection event.

Note 8

The calculating unit can generate a distribution function of the light emission at each timing based on the first photon-number information, and can calculate the first light emission probability model based on the distribution function.

Note 9

The obtaining unit can obtain the first photon-number information on a detector-by-detector basis.

Note 10

The obtaining unit can obtain the first photon-number information on an event-by-event basis.

Note 11

The calculating unit can calculate the first light emission probability model by taking into account the uncertainty of the light emission position inside a scintillator.

Note 12

A data processing method according to an aspect of the present invention includes obtaining first photon-number information detected by a first detector; calculating, based on the first photon-number information, a first light emission probability model corresponding to the first detector; identifying, based on the first light emission probability model, a first timing at which the detection probability becomes equal to or greater than a predetermined threshold value; measuring the detection timing of an event detected by the first detector; and correcting the detection timing based on the first timing.

Note 13

A non-transitory computer-readable storage medium having a computer program stored therein, wherein the computer program, when executed by a computer, causes the computer to perform obtaining first photon-number information detected by a first detector; calculating, based on the first photon-number information, a first light emission probability model corresponding to the first detector; identifying, based on the first light emission probability model, a first timing at which the detection probability becomes equal to or greater than a predetermined threshold value; measuring the detection timing of an event detected by the first detector; and correcting the detection timing based on the first timing.

According to at least one embodiment described above, it becomes possible to enhance the image quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nuclear medicine diagnostic device comprising processing circuitry configured to
    obtain first photon-number information detected by a first detector,
    calculate, based on the first photon-number information, a first light emission probability model corresponding to the first detector,
    identify, based on the first light emission probability model, a first timing at which detection probability becomes equal to or greater than a predetermined threshold value,
    measure a detection timing of an event detected by the first detector, and
    correct the detection timing based on the first timing.

2. The nuclear medicine diagnostic device according to claim 1, wherein the first photon-number information includes a scintillation photon number.

3. The nuclear medicine diagnostic device according to claim 2, wherein the first photon-number information further includes a Cerenkov photon number.

4. The nuclear medicine diagnostic device according to claim 1, wherein the processing circuitry is configured to identify the first timing based on cumulative distribution of distribution indicated by the first light emission probability model.

5. The nuclear medicine diagnostic device according to claim 1, wherein the processing circuitry is configured to identify the first timing based on timing at which distribution indicated by the first light emission probability model exhibits extreme value.

6. The nuclear medicine diagnostic device according to claim 1, wherein the first light emission probability model is related to probability density for detecting initial photons from among a plurality of photons included in a detection event.

7. The nuclear medicine diagnostic device according to claim 6, wherein the processing circuitry is configured to
    generate a distribution function of light emission at each timing based on the first photon-number information, and
    calculate the first light emission probability model based on the distribution function.

8. The nuclear medicine diagnostic device according to claim 1, wherein the first light emission probability model is related to probability density for detecting a predetermined number of photons from among a plurality of photons included in a detection event.

9. The nuclear medicine diagnostic device according to claim 1, wherein the processing circuitry is configured to obtain the first photon-number information on a detector-by-detector basis.

10. The nuclear medicine diagnostic device according to claim 1, wherein the processing circuitry is configured to obtain the first photon-number information on an event-by-event basis.

11. The nuclear medicine diagnostic device according to claim 1, wherein the processing circuitry is configured to calculate the first light emission probability model by taking into account uncertainty of light emission position inside a scintillator.

12. A data processing method comprising:
- obtaining first photon-number information detected by a first detector;
- calculating, based on the first photon-number information, a first light emission probability model corresponding to the first detector;
- identifying, based on the first light emission probability model, a first timing at which detection probability becomes equal to or greater than a predetermined threshold value;
- measuring a detection timing of an event detected by the first detector; and
- correcting the detection timing based on the first timing.

13. A non-transitory computer-readable storage medium having a computer program stored therein, wherein the computer program, when executed by a computer, causes the computer to perform:
- obtaining first photon-number information detected by a first detector;
- calculating, based on the first photon-number information, a first light emission probability model corresponding to the first detector;
- identifying, based on the first light emission probability model, a first timing at which detection probability becomes equal to or greater than a predetermined threshold value;
- measuring a detection timing of an event detected by the first detector; and
- correcting the detection timing based on the first timing.

* * * * *